US008107885B2

(12) United States Patent
Love et al.

(10) Patent No.: US 8,107,885 B2
(45) Date of Patent: Jan. 31, 2012

(54) METHOD AND APPARATUS FOR PROVIDING A DISTRIBUTED ARCHITECTURE DIGITAL WIRELESS COMMUNICATION SYSTEM

(75) Inventors: Robert T. Love, Barrington, IL (US); Kenneth A. Stewart, Grayslake, IL (US); Amitava Ghosh, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 526 days.

(21) Appl. No.: 10/695,513

(22) Filed: Oct. 28, 2003

(65) Prior Publication Data
US 2004/0116143 A1 Jun. 17, 2004

Related U.S. Application Data

(60) Provisional application No. 60/422,734, filed on Oct. 30, 2002.

(51) Int. Cl.
*H04B 17/00* (2006.01)
(52) U.S. Cl. .................. 455/67.11; 455/522; 455/562.1; 455/452.2; 455/434; 455/442; 370/329; 370/331; 370/252; 370/342; 370/431; 370/318; 370/465; 370/445; 370/208; 370/348; 714/751; 718/102
(58) Field of Classification Search .................. 455/436, 455/442, 443, 522, 525, 562.1, 452.2, 434; 370/329, 331, 332, 252, 335, 342, 431, 348, 370/318, 465, 341, 328, 445, 208; 714/751; 718/102; 357/262
See application file for complete search history.

(56) References Cited

U.S. PATENT DOCUMENTS

| | | | | |
|---|---|---|---|---|
| 5,991,618 A | * | 11/1999 | Hall | .............................. 455/425 |
| 6,091,717 A | * | 7/2000 | Honkasalo et al. | ........... 370/329 |
| 6,094,426 A | | 7/2000 | Honkasalo et al. | |
| 6,463,044 B1 | | 10/2002 | Seo | |

(Continued)

FOREIGN PATENT DOCUMENTS

CA    2438527 A1    8/2002

(Continued)

OTHER PUBLICATIONS

Ericsson, Techniques for Uplink Enhancements for Dedicated Transport Channels, TSG-RAN WG1 #28bis, Tdoc R1-02-1225, Espoo, Finland, Oct. 8-9, 2002 pp. 1-4.

(Continued)

*Primary Examiner* — April G Gonzales
(74) *Attorney, Agent, or Firm* — Steven A. May

(57) ABSTRACT

A communication system supports H-ARQ, AMC, active set handoff, and scheduling functions in a distributed fashion by allowing a mobile station (MS) to signal control information corresponding to an enhanced reverse link transmission to Active Set base transceiver stations (BTSs) and by allowing the BTSs to perform control functions that were supported by an RNC in the prior art. The communication system allows time and SIR-based H-ARQ flush functions at the BTSs during soft handoff (SHO), provides an efficient control channel structure to support scheduling, H-ARQ, AMC functions for an enhanced reverse link, or uplink, channel in order to maximize throughput, and enables an MS in a SHO region to choose a scheduling assignment corresponding to a best TFRI out of multiple assignments it receives from multiple active set BTS. As a result, the enhanced uplink channel can be scheduled during SHO without any explicit communication between the BTSs.

46 Claims, 12 Drawing Sheets

U.S. PATENT DOCUMENTS

| | | | |
|---|---|---|---|
| 6,532,225 B1* | 3/2003 | Chang et al. | 370/341 |
| 6,763,009 B1* | 7/2004 | Bedekar et al. | 370/335 |
| 6,765,897 B2* | 7/2004 | Cordier et al. | 370/342 |
| 6,836,666 B2* | 12/2004 | Gopalakrishnan et al. | 455/452.2 |
| 6,873,626 B2* | 3/2005 | Hayashi et al. | 370/465 |
| 6,987,738 B2* | 1/2006 | Subramanian et al. | 370/252 |
| 6,999,439 B2* | 2/2006 | Takano | 370/335 |
| 7,010,317 B2* | 3/2006 | Hwang et al. | 455/522 |
| 7,020,126 B2* | 3/2006 | Choi et al. | 370/342 |
| 7,047,473 B2* | 5/2006 | Hwang et al. | 714/751 |
| 7,062,295 B2* | 6/2006 | Yoshii et al. | 455/562.1 |
| 7,069,038 B2* | 6/2006 | Hakkinen et al. | 455/522 |
| 7,099,346 B1* | 8/2006 | Kanterakis | 370/431 |
| 7,158,504 B2* | 1/2007 | Kadaba et al. | 370/348 |
| 7,185,256 B2 | 2/2007 | Miki et al. | |
| 7,194,741 B2* | 3/2007 | Tayyar et al. | 718/102 |
| 7,277,406 B2* | 10/2007 | Kim et al. | 370/318 |
| 2001/0000750 A1 | 5/2001 | Esteves et al. | |
| 2002/0075838 A1 | 6/2002 | Choi et al. | |
| 2002/0093953 A1 | 7/2002 | Naim et al. | |
| 2002/0115464 A1 | 8/2002 | Hwang et al. | |
| 2002/0147022 A1 | 10/2002 | Subramanian et al. | |
| 2002/0168945 A1 | 11/2002 | Hwang et al. | |
| 2002/0193133 A1* | 12/2002 | Shibutani | 455/522 |
| 2003/0043839 A1* | 3/2003 | Luschi et al. | 370/445 |
| 2003/0045288 A1* | 3/2003 | Luschi et al. | 455/434 |
| 2003/0095605 A1* | 5/2003 | Das et al. | 375/262 |
| 2003/0128658 A1* | 7/2003 | Walton et al. | 370/208 |
| 2003/0142694 A1 | 7/2003 | Takano | |
| 2003/0228876 A1* | 12/2003 | Hwang | 455/522 |
| 2004/0203980 A1* | 10/2004 | Das et al. | 455/522 |
| 2005/0025090 A1* | 2/2005 | Klein et al. | 370/328 |

FOREIGN PATENT DOCUMENTS

| | | |
|---|---|---|
| EP | 1 091 515 A1 | 11/2001 |
| JP | 2001-177877 A | 6/2001 |
| JP | 2001-516975 A | 10/2001 |
| JP | 2002-009741 A | 1/2002 |
| WO | 9845966 | 10/1998 |
| WO | WO99-09779 A1 | 2/1999 |
| WO | 0049756 A2 | 8/2000 |
| WO | 0171521 A1 | 9/2001 |
| WO | WO02-37872 A2 | 5/2002 |
| WO | WO 02-065667 A1 | 8/2002 |

OTHER PUBLICATIONS

Motorola, Uplink enhancements for dedicated transport channels, 3GPPRAN 1#28-bis, Tdoc #R1-02-1250, Espoo, Finland, Oct. 8-9, 2002, pp. 1-4.

Nokia, Uplink enhancements for Dedicated Transport Channels, TSG-RAN WG1 #28bis meeting, Tdoc R1-02-1219, Espoo, Finland, Oct. 8-9, 2002, pp. 1-4.

Kolding T E et al.: "Performance aspects of wcdma systems with high speed downlink packet access (hsdpa)", Sep. 24, 2002, VTC 2002-Fall 2002 IEEE 56th, Vehicular Technology Conference Proceedings, Vancouver, Canada, Sep. 24-28, 2002, IEEE Vehicular Technology Conference, New York, NY: IEEE, US pp. 477-481.

3GPP, "3GPP TS 25.133 v3.11.0—Requirements for Support of Radio Resource Management (FDD)," 3rd Generation Partnership Project; Technical Specification Group Radio Access Network, Sep. 2002, 3 pages.

Japanese Examiner, "Corresponding Application 2008-136790—Notification of Reasons for Rejection," Japanese Patent Office, Tokyo, Japan, Jun. 15, 2010, 4 pages.

Japanese Examiner, "Corresponding Application 2008-136791—Notification of Reasons for Rejection," Japanese Patent Office, Tokyo, Japan, Jun. 15, 2010, 3 pages.

Canada Official Action, Oct. 22, 2010, all pages.

Canadian Intellectual Property Office, Canadian Rejection, Aug. 10, 2011, all pages.

\* cited by examiner

—PRIOR ART—

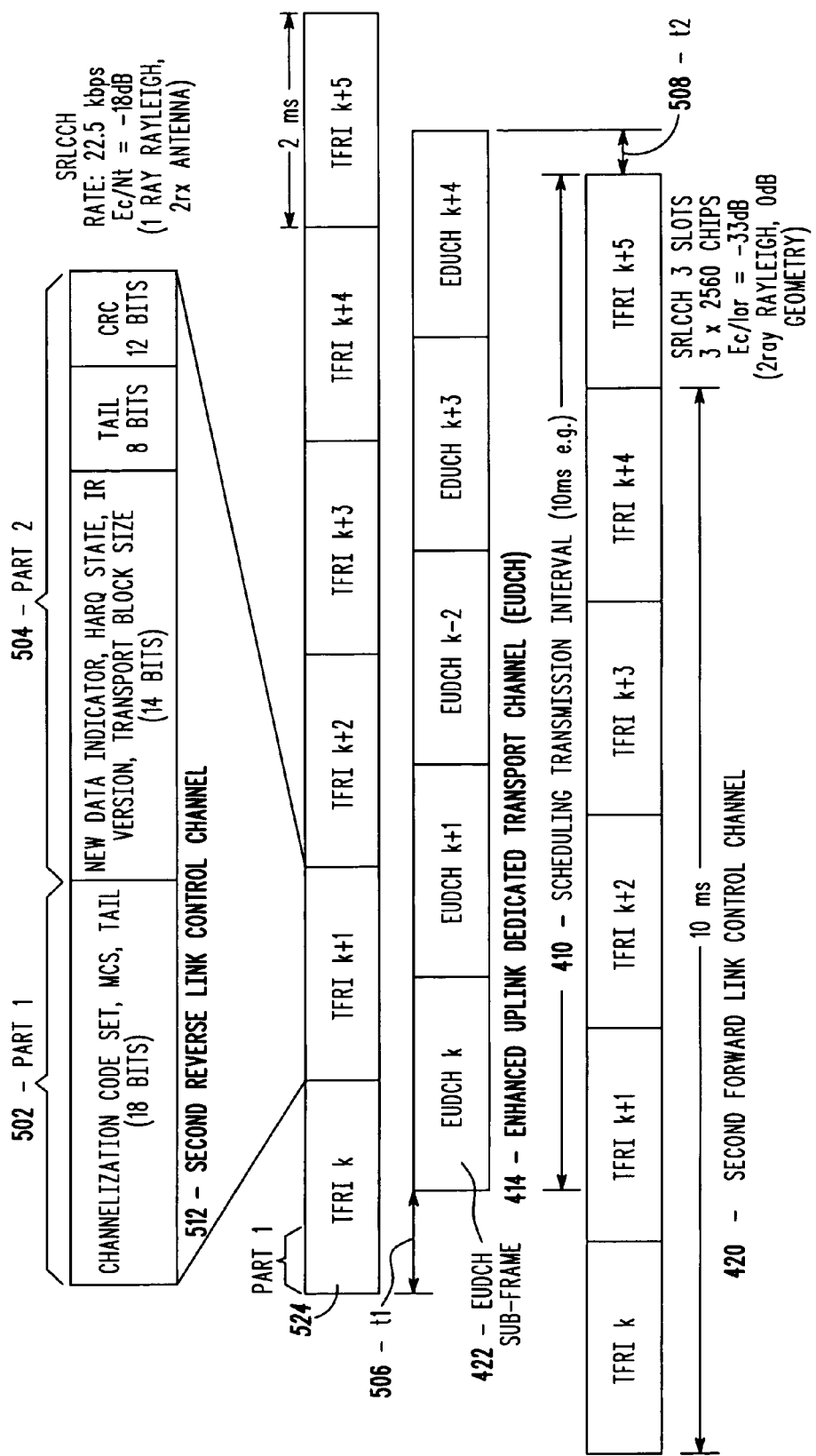

SECOND REVERSE LINK CONTROL CHANNEL WITH FIRST AND SECOND PARTS WHERE FIRST REVERSE LINK CONTROL CHANNEL AND SECOND REVERSE LINK CONTROL CHANNEL USE THE SAME PHYSICAL CHANNEL

EXAMPLARY CONFIGURATION OF SPREADING FOR REVERSE LINK (OR UPLINK) DPCCH, DPDCHs, AND EUDCH AND ASSOCIATED REVERSE LINK CONTROL CHANNELS

CHANNEL STRUCTURE WHEN SECOND REVERSE LINK CONTROL CHANNEL AND EUDCH AND SECOND FORWARD LINK CONTROL CHANNEL USE SUB-FRAMES OF 3.33ms

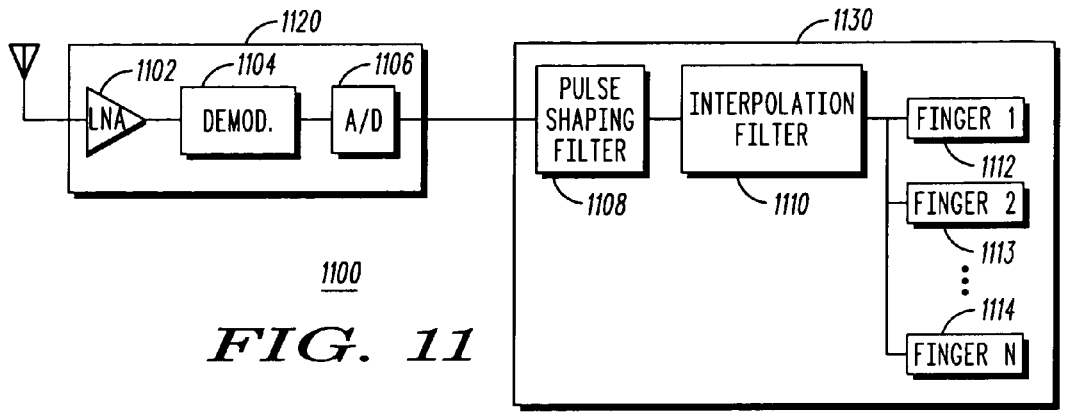

METHOD AND APPARATUS FOR PROVIDING A DISTRIBUTED ARCHITECTURE DIGITAL WIRELESS COMMUNICATION SYSTEM

REFERENCE(S) TO RELATED APPLICATION(S)

The present application claims priority from provisional application Ser. No. 60/422,734, entitled "METHOD AND APPARATUS FOR PROVIDING A DISTRIBUTED ARCHITECTURE DIGITAL WIRELESS COMMUNICATION SYSTEM," filed Oct. 30, 2002, which is commonly owned and incorporated herein by reference in its entirety.

FIELD OF THE INVENTION

The present invention relates generally to wireless communication systems, and more specifically to a method and apparatus for providing a distributed architecture digital wireless communication system that efficiently supports Hybrid ARQ, Adaptive Modulation and Coding, fast Scheduling, and Soft Handoff.

BACKGROUND OF THE INVENTION

Interim Standard IS-95-A (IS-95) has been adopted by the Telecommunications Industry Association for implementing CDMA in a cellular system. In a CDMA communication system, a mobile station (MS) communicates with any one or more of a plurality of base station subsystems (BSSs) dispersed in a geographic region. Each BSS continuously transmits a pilot channel signal having the same spreading code but with a different code phase offset. Phase offset allows the pilot signals to be distinguished from one another, which in turn allows the base stations to be distinguished. Hereinafter, a pilot signal of a BSS will be simply referred to as a pilot. The MS monitors the pilots and measures the received energy of the pilots.

IS-95 defines a number of states and channels for communications between the MS and the BS. For example, in the Mobile Station Control on the Traffic State, the BSS communicates with the MS over a Forward Traffic Channel in a forward link and the MS communicates with the BSS over a Reverse Traffic Channel in a reverse link. During a call, the MS must constantly monitor and maintain four sets of pilots. The four sets of pilots are collectively referred to as the Pilot Set and include an Active Set, a Candidate Set, a Neighbor Set, and a Remaining Set.

The Active Set are pilots associated with the Forward Traffic Channel assigned to the MS. The Candidate Set are pilots that are not currently in the Active Set but have been received by the MS with sufficient strength to indicate that an associated Forward Traffic Channel could be successfully demodulated. The Neighbor Set are pilots that are not currently in the Active Set or Candidate Set but are likely candidates for handoff. The Remaining Set are all possible pilots in the current system on the current CDMA frequency assignment, excluding the pilots in the Neighbor Set, the Candidate Set, and the Active Set.

Typically, a BSS services a coverage area that is divided up into multiple sectors. In turn, each sector is serviced by one or more of multiple base transceiver stations (BTSs) included in the BSS. When the MS is serviced by a first BTS, the MS constantly searches pilot channels of neighboring BTSs for a pilot that is sufficiently stronger than a threshold value. The MS signals this event to the first, serving BTS using a Pilot Strength Measurement Message. As the MS moves from a first sector serviced by a first BTS to a second sector serviced by a second BTS, the communication system promotes certain pilots from the Candidate Set to the Active Set and from the Neighbor Set to the Candidate Set. The serving BTS notifies the MS of the promotions via a Handoff Direction Message. Then, when the MS commences communication with a new BTS that has been added to the Active Set before terminating communications with an old BTS, a "soft handoff" has occurred.

For the reverse link, typically each BTS in the Active Set independently demodulates and decodes each frame or packet received from the MS. It is then up to a switching center to arbitrate between each Active Set BTS's decoded frames. Such soft handoff operation has multiple advantages. Qualitatively, this feature improves and renders more reliable handoff between BTSs as a user moves from one sector to the adjacent one. Quantitatively soft-handoff improves the capacity/coverage in a CDMA system.

For example, FIG. 1 is a block diagram of communication system 100 of the prior art. Preferably, communication system 100 is a CDMA2000 or a WCDMA system. Communication system 100 includes multiple cells (seven shown), wherein each cell is divided into three sectors (a, b, and c). A base station subsystem (BSS) 101-107 located in each cell provides communications service to each mobile station located in that cell. Each BSS 101-107 includes multiple BTSs, which BTSs wirelessly interface with the mobile stations located in the sectors of the cell serviced by the BSS. Communication system 100 further includes a radio network controller (RNC) 110 coupled to each BSS and a gateway 112 coupled to the RNC. Gateway 112 provides an interface for communication system 100 with an external network such as a Public Switched Telephone Network (PSTN) or the Internet.

The quality of a communication link between an MS, such as MS 114, and the BSS servicing the MS, such as BSS 101, typically varies over time and movement by the MS. As a result, as the communication link between MS 114 and BSS 101 degrades, communication system 100 provides a soft handoff (SHO) procedure by which MS 114 can be handed off from a first communication link whose quality has degraded to another, higher quality communication link. For example, as depicted in FIG. 1, MS 114, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-*b*, 3-*c*, and 4-*a*, are known in the art as the Active Set of the MS.

Referring now to FIG. 2, a soft handoff procedure performed by communication system 100 is illustrated. FIG. 2 is a block diagram of a hierarchical structure of communication system 100. As depicted in FIG. 2, RNC 110 includes an ARQ function 210, a scheduler 212, and a soft handoff (SHO) function 214. FIG. 2 further depicts multiple BTSs 201-207, wherein each BTS provides a wireless interface between a corresponding BSS 101-107 and the MSs located in a sector serviced by the BSS.

When performing a soft handoff, each BTS 201, 203, 204 in the Active Set of the MS 114 receives a transmission from MS 114 over a reverse link of a respective communication channel 221, 223, 224. The Active Set BTSs 201, 203, and 204 are determined by SHO function 214. Upon receiving the transmission from MS 114, each Active Set BTS 201, 203, 204 demodulates and decodes the contents of a received radio frame. Each Active Set BTS 201, 203, 204 then conveys the demodulated and decoded radio frame to RNC 110, along with related frame quality information.

RNC 110 receives the demodulated and decoded radio frames along with related frame quality information from each BTS 201, 203, 204 in the Active Set and selects a best frame based on frame quality information. Scheduler 212 and ARQ function 210 of RNC 110 then generate control channel information that is distributed as identical pre-formatted radio frames to each BTS 201, 203, 204 in the Active Set. The Active Set BTSs 201, 203, 204 then simulcast the pre-formatted radio frames over the forward link. The control channel information is then used by MS 114 to determine what transmission rate to use.

In order to achieve higher throughput and lower latency, it is desirable to increase high data rate coverage of a reverse link. To achieve these requirements on the reverse link, communication systems such as communication system 100 have adapted techniques such as Hybrid Automatic Repeat ReQuest (H-ARQ) and Adaptive Modulation and Coding (AMC).

Adaptive Modulation and Coding (AMC) provides the flexibility to match the modulation and forward error correction (FEC) coding scheme to the average channel conditions for each user, or MS, serviced by the communication system. AMC promises a large increase in average data rate for users that have a favorable channel quality due to their proximity to a BTS or other geographical advantage. Enhanced GSM systems using AMC offer data rates as high as 384 kbps compared to 100 kbps without AMC. Likewise, 5 MHz CDMA systems can offer downlink and uplink peak data rates as high as 10 Mbps and 2 Mbps respectively through AMC, where 2 Mbps and 384 kbps was typical without AMC.

AMC has several drawbacks. AMC is sensitive to measurement error and delay. In order to select the appropriate modulation, the scheduler, such as scheduler 212, must be aware of the channel quality. Errors in the channel estimate will cause the scheduler to select the wrong data rate and either transmit at too high a power, wasting system capacity, or too low a power, raising the block error rate. Delay in reporting channel measurements also reduces the reliability of the channel quality estimate due to constantly varying mobile channel. To overcome measurement delay, a frequency of the channel measurement reports may be increased. However, an increase in measurement reports consumes system capacity that otherwise might be used to carry data.

Hybrid ARQ is an implicit link adaptation technique. Whereas, in AMC explicit C/I measurements or similar measurements are used to set the modulation and coding format, in H-ARQ, link layer acknowledgements are used for re-transmission decisions. Many techniques have been developed for implementing H-ARQ, such as Chase combining, Rate compatible Punctured Turbo codes, and Incremental Redundancy. Incremental Redundancy, or H-ARQ-type-II, is an implementation of the H-ARQ technique wherein instead of sending simple repeats of the entire coded packet, additional redundant information is incrementally transmitted if the decoding fails on the first attempt.

H-ARQ-type-III also belongs to the class of Incremental Redundancy ARQ schemes. However, with H-ARQ-type-III, each retransmission is self-decodable, which is not the case with H-ARQ-type II. Chase combining (also called H-ARQ-type-III with one redundancy version) involves the retransmission by the transmitter of the same coded data packet. The decoder at the receiver combines these multiple copies of the transmitted packet weighted by the received SNR. Diversity (time) gain as well as coding gain (for IR only) is thus obtained after each re-transmission. In H-ARQ-type-III with multiple redundancy, different puncture bits are used in each retransmission. The details for how to implement the various H-ARQ schemes are commonly known in the art and therefore are not discussed herein.

H-ARQ combined with AMC can greatly increase user throughputs, potentially doubling/trebling system capacity. In effect, Hybrid ARQ adapts to the channel by sending additional increments of redundancy, which increases the coding rate and effectively lowers the data rate to match the channel. Hybrid ARQ does not rely only on channel estimates but also relies on the errors signaled by the ARQ protocol. Currently, in CDMA2000 and WCDMA systems, the reverse link ARQ function, such as ARQ function 210, and a scheduling function, such as scheduling function 212, reside in an RNC, such as RNC 110. The location of the ARQ function and the scheduling function in the RNC is dictated by a need to support soft handoffs, since the soft handoff function, such as soft handoff function 214, also resides in the RNC. However, a result of locating these functions in the RNC is that the BSSs, such as BSSs 101-107 and their associated BTSs 201-107, can only communicate through the RNC, resulting in latency penalties.

Therefore, a need exists for a new architecture for a digital wireless communication system that will reduce the scheduling and ARQ delays of the prior art communication systems.

BRIEF DESCRIPTION OF THE DRAWINGS

FIG. 5A is a block diagram of a second reverse link control channel, a second forward link control channel, and an enhanced uplink dedicated transport channel in accordance with another embodiment of the present invention.

FIG. 11 is a block diagram of a received signal path of a base station of FIG. 3 in accordance with an embodiment of the present invention.

FIG. 12 is an exemplary illustration of a map included in a scheduling assignment in accordance with an embodiment of the present invention.

FIG. 13 is an exemplary illustration of a map included in a scheduling assignment in accordance with another embodiment of the present invention.

DETAILED DESCRIPTION OF THE INVENTION

Figure 1:
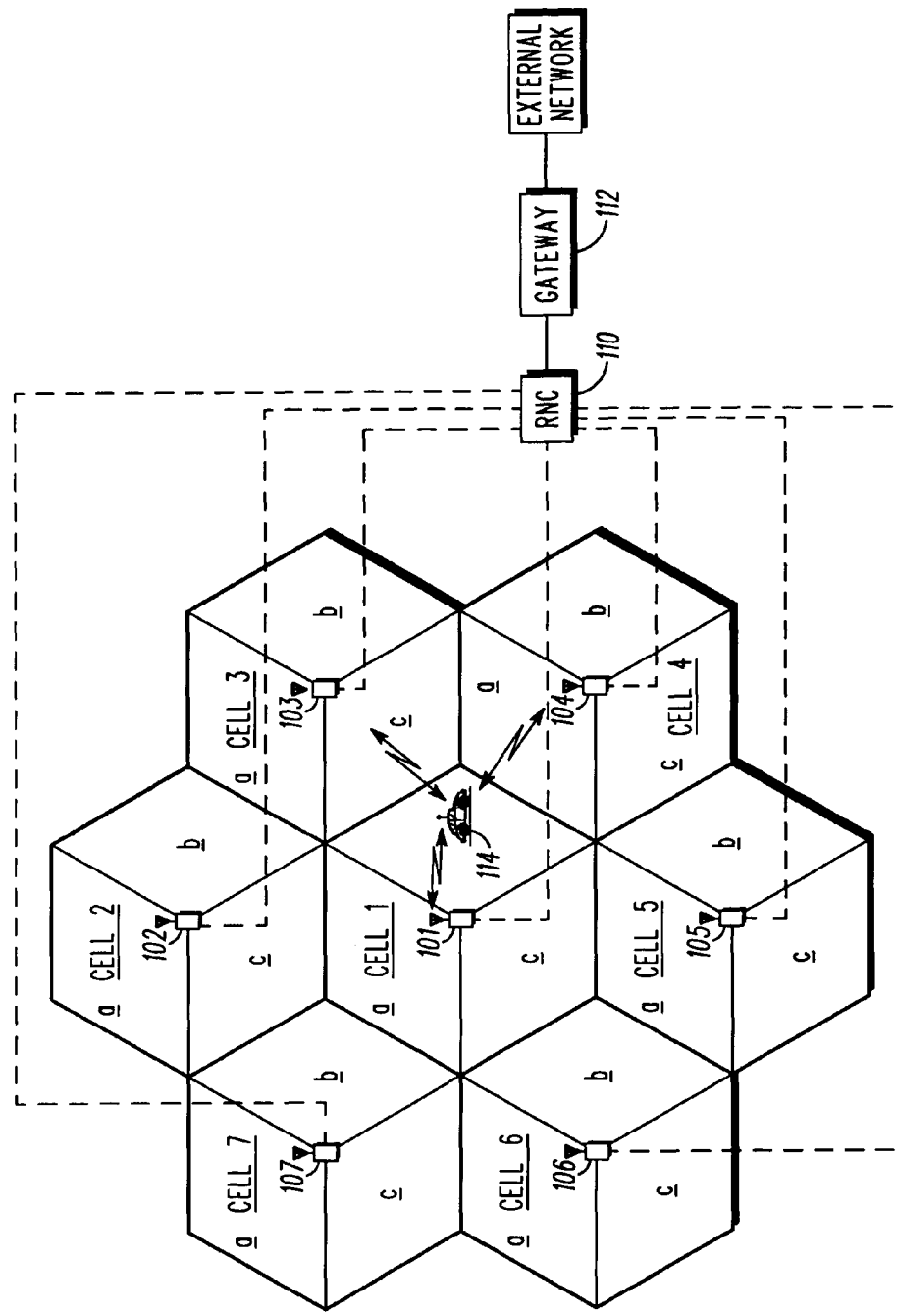
FIG. 1 is a block diagram of an exemplary communication system of the prior art.
Figure 2:
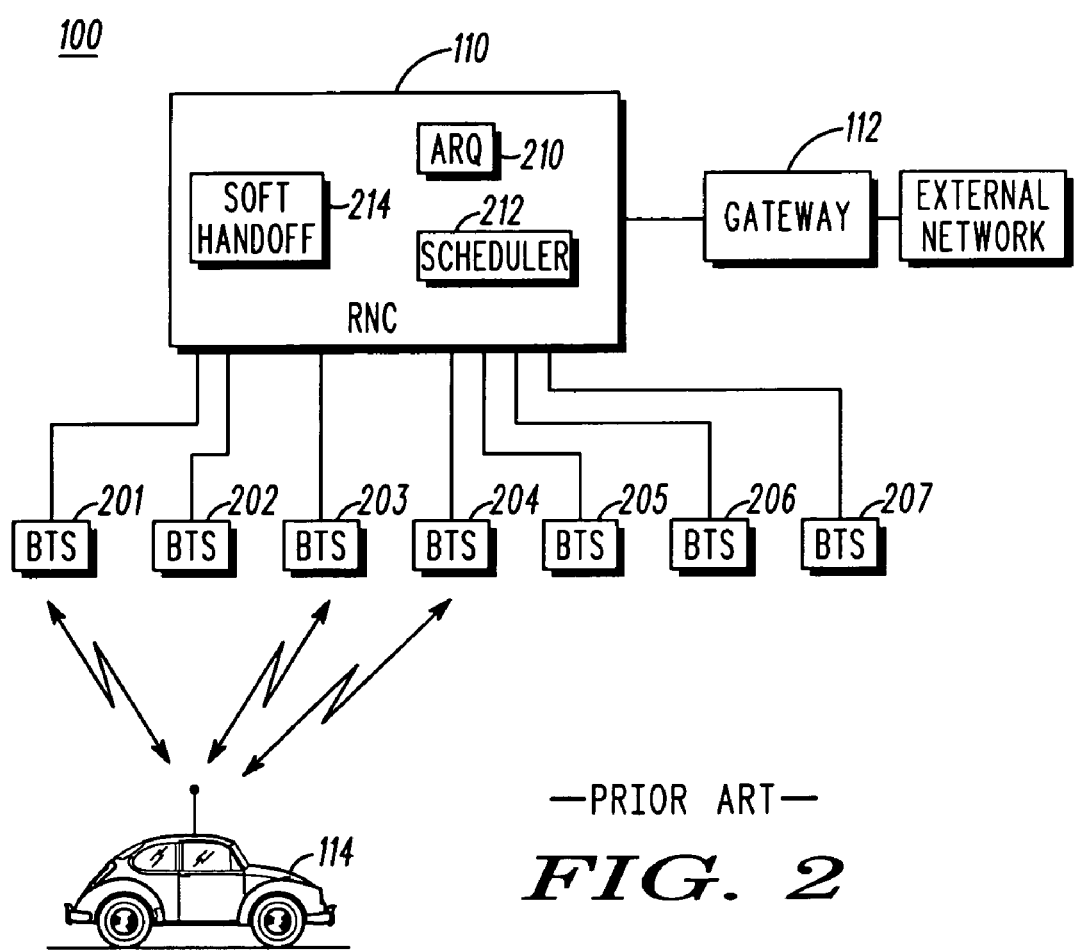
FIG. 2 is a block diagram of a hierarchical structure of the communication system of FIG. 1.

To address the need for a new architecture for a digital wireless communication system that will reduce the scheduling and Automatic Repeat Request (ARQ) delays of the prior art communication systems, a communication system is provided that allows implementation of an enhanced reverse link channel with adaptive modulation and coding (AMC), Hybrid ARQ (H-ARQ), and fast scheduling with reduced ARQ delay. The communication system supports H-ARQ, AMC, active set handoff, and scheduling functions in a distributed fashion by allowing a mobile station (MS) to signal control information corresponding to an enhanced reverse link transmission to Active Set base transceiver stations (BTSs) and by allowing the BTSs to perform control functions that were supported by a radio network controller (RNC) in the prior art. The communication system allows time and signal-to-noise ratio (SNR)-based H-ARQ flush functions at the BTSs during soft handoff (SHO), provides an efficient control channel structure to support scheduling, H-ARQ, AMC functions for an enhanced reverse link, or uplink, channel in order to maximize throughput, and enables an MS in a SHO region to choose a scheduling assignment corresponding to a best transport format and resource-related information (TFRI) out of multiple scheduling assignments that the MS receives from multiple active set BTS. As a result, the enhanced uplink channel can be scheduled during SHO, while supporting H-ARQ and AMC, without any explicit communication between the BTSs.

Generally, an embodiment of the present invention encompasses a method for selecting a scheduling assignment by a mobile station. The method includes steps of receiving a scheduling assignment from each base station of multiple active set base stations to produce multiple scheduling assignments and selecting a scheduling assignment of the received multiple scheduling assignments.

Another embodiment of the present invention encompasses a method for transmitting data by a mobile station. The method includes steps of transmitting data in a first uplink channel and transmitting corresponding transport format related information in a second uplink channel, wherein the transport format related information can be used to demodulate and decode the transmitted data.

Still another embodiment of the present invention encompasses a method for controlling communications with a mobile station by a base station. The method includes steps of storing, by the base station, traffic data from the mobile station in a traffic data buffer, determining a link quality metric at the base station, comparing the link quality metric to a threshold, and, when the link quality metric compares unfavorably with the threshold, flushing the traffic data buffer.

Yet another embodiment of the present invention encompasses a method for controlling communications with a mobile station by a base station. The method includes steps of storing, by the base station, traffic data from the mobile station in a traffic data buffer, transmitting, by the base station, first control data to the mobile station on a downlink control channel, and, upon transmitting the first control data, starting, by the base station, a timer. The method further includes a step of, when a predetermined period of time expires prior to receiving second control data from the mobile station on an uplink control channel, flushing the traffic data buffer.

Still another embodiment of the present invention encompasses a method for controlling communications with a mobile station by a base station. The method includes steps of determining, by the base station, a link quality metric at the base station, comparing, by the base station, the link quality metric to a threshold, and, when the link quality metric compares unfavorably with the threshold, deallocating, by the base station, demodulation resources allocated to a first uplink control channel associated with the mobile station while maintaining allocation of demodulation resources associated with a second uplink control channel that is associated with the mobile station.

Yet another embodiment of the present invention encompasses a method for controlling communications with a mobile station by a base station. The method includes steps of transmitting, by the base station, first control data to the mobile station on a downlink control channel and, upon transmitting the first control data, starting, by the base station, a timer. The method further includes a step of, when a predetermined period of time expires prior to receiving second control data from the mobile station on an uplink control channel, deallocating, by the base station, demodulation resources allocated to a first uplink control channel associated with the mobile station while maintaining allocation of demodulation resources associated with a second uplink control channel that is associated with the mobile station.

Still another embodiment of the present invention encompasses a method for scheduling mobile station uplink transmissions for a selected mobile station of a plurality of mobile stations by a base station. The method includes steps of receiving scheduling information from at least one mobile station of the plurality of mobile stations, wherein the scheduling information includes at least one of a queue status and a power status of the at least one mobile station, and selecting a mobile station of the plurality of mobile stations and determining an uplink channel scheduling assignment for the selected mobile station using at least one of the scheduling information and a base station interference metric and an uplink quality corresponding to the selected mobile station. The method further includes a step of transmitting the uplink channel scheduling assignment to the selected mobile station, wherein the uplink channel scheduling assignment includes at least one of a sub-frame assignment and a maximum power margin target and a maximum power level target and a maximum transport format related information.

The present invention may be more fully described with reference to FIGS. 3-13. FIG. 10 is a block diagram of a communication system 1000 in accordance with an embodiment of the present invention. Preferably, communication system 1000 is a Code Division Multiple Access (CDMA) communication system, such as CDMA 2000 or Wideband CDMA (WCDMA) communication system, that includes multiple communication channels. Each communication channel comprises an orthogonal code, such as a Walsh code, that is different from and orthogonal to an orthogonal code associated with each of the other communication channels. However, those who are of ordinary skill in the art realize that communication system 1000 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

Similar to communication system 100, communication system 1000 includes multiple cells (seven shown). Each cell is divided into multiple sectors (three shown for each cell—sectors a, b, and c). A base station subsystem (BSS) 1001-1007 located in each cell provides communications service to each mobile station located in that cell. Each BSS 1001-1007 includes multiple base stations, also referred to herein as base transceiver stations (BTSs), which BTSs wirelessly interface with the mobile stations located in the sectors of the cell serviced by the BSS. Communication system 1000 further includes a radio network controller (RNC) 1010 coupled to each BSS, preferably through a 3GPP TSG UTRAN Iub Interface, and a gateway 1012 coupled to the RNC. Gateway 1012 provides an interface for communication system 1000 with an external network such as a Public Switched Telephone Network (PSTN) or the Internet.

Figure 3:
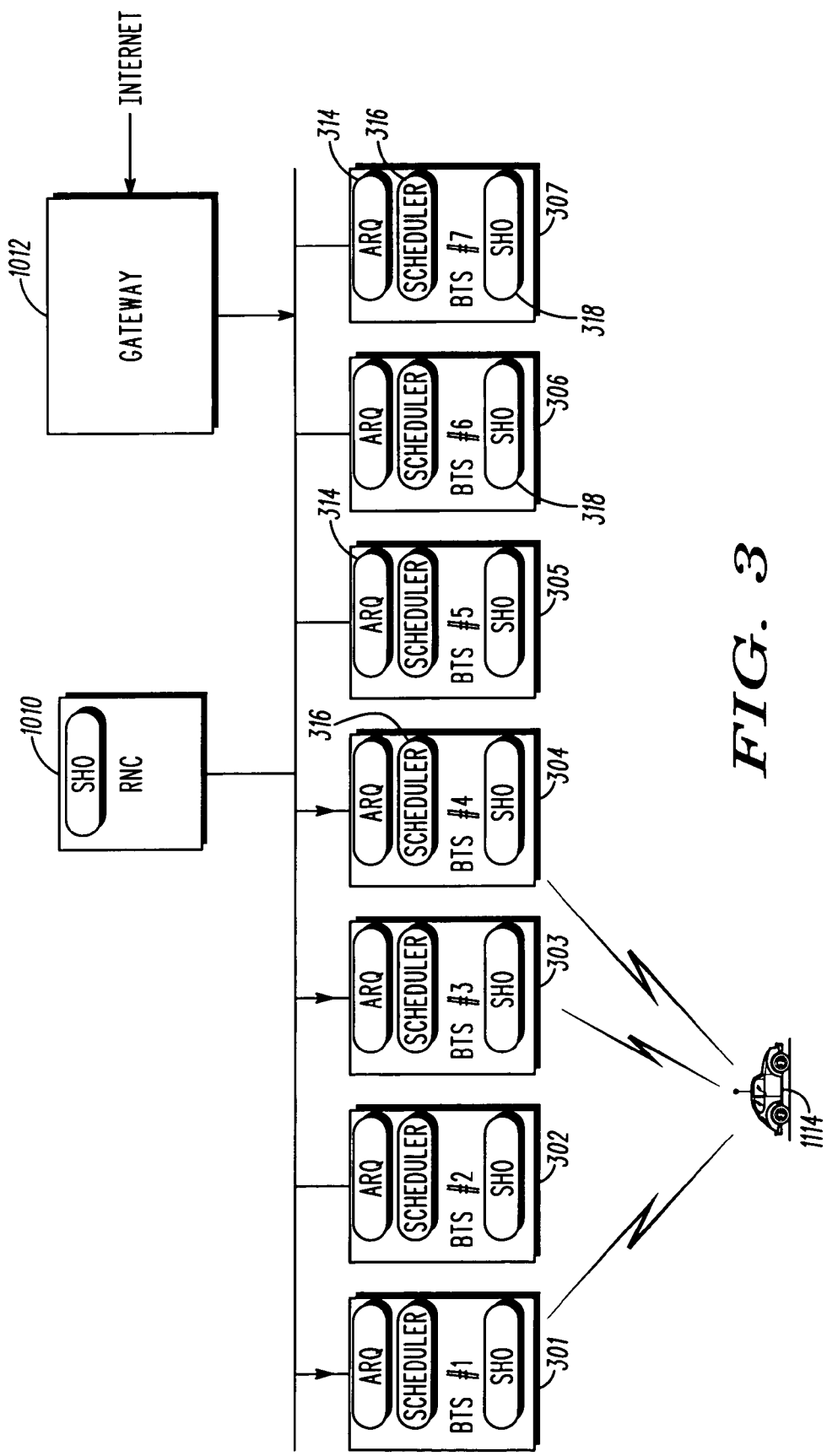
FIG. 3 depicts a distributed network architecture in accordance with an embodiment of the present invention.

Referring now to FIGS. 3 and 10, communication system 1000 further includes at least one mobile station (MS) 1014. MS 1014 may be any type of wireless user equipment (UE), such as a cellular telephone, a portable telephone, a radiotelephone, or a wireless modem associated with data terminal equipment (DTE) such as a personal computer (PC) or a laptop computer. MS 1014 is serviced by multiple base stations, or BTSs, that are included in an Active Set associated with the MS. MS 1014 wirelessly communicates with each BTS in communication system 1000 via an air interface that includes a forward link (from the BTS to the MS) and a reverse link (from the MS to the BTS). Each forward link includes multiple forward link control channels, a paging channel, and traffic channel. Each reverse link includes multiple reverse link control channels, a paging channel, and a traffic channel. However, unlike communication system 100 of the prior art, each reverse link of communication system 1000 further includes another traffic channel, an Enhanced Uplink Dedicated Transport Channel (EUDCH), that facilitates high speed data transport by permitting a transmission of data that can be dynamically modulated and coded, and demodulated and decoded, on a sub-frame by sub-frame basis. An example of how the EUDCH could be incorporated into the reverse link spreading and channelization structure used in WCDMA is given in FIG. 6.

Communication system 1000 includes a soft handoff (SHO) procedure by which MS 1014 can be handed off from a first air interface whose quality has degraded to another, higher quality air interface. For example, as depicted in FIG. 10, MS 1014, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-b, 3-c, and 4-a, are the Active Set of the MS. In other words, MS 1014 is in soft handoff (SHO) with the BTSs 301, 303, and 304, associated with the sectors 1-b, 3-c, and 4-a servicing the MS, which BTSs are the Active Set of the MS. As used herein, the terms 'Active Set' and 'serving,' such as an Active Set BTS and a serving BTS, are interchangeable and both refer to a BTS that is in an Active Set of an associated MS. Furthermore, although FIGS. 3 and 10 depict BTSs 301, 303, and 304 as servicing only a single MS, those who are of ordinary skill in the art realize that each BTS 301-307 may concurrently schedule, and service, multiple MSs, that is, each BTS 301-307 may concurrently be a member of multiple Active Sets.

FIG. 3 depicts a network architecture 300 of communication system 1000 in accordance with an embodiment of the present invention. As depicted in FIG. 3, communication system includes multiple BTSs 301-307, wherein each BTS provides a wireless interface between a corresponding BSS 1001-1007 and the MSs located in a sector serviced by the BTS. In communication system 1000, a scheduling function 316, an ARQ function 314 and a SHO function 318 are distributed in each of the BTSs 301-307. As a result, RNC 1010 has reduced functionality relative to RNC 110 of the prior art. RNC 1010 is responsible for managing mobility by defining the members of the Active Set of each MS serviced by communication system 1000, such as MS 1014, and for coordinating multicast/multireceive groups. For each MS in communication system 1000, Internet Protocol (IP) packets are multi-cast directly to each BTS in the Active Set of the MS, that is, to BTSs 301, 303, 304 in the Active Set of MS 1014.

As noted above, each BTS 301-307 of communication system 1000 includes a SHO function 318 that performs at least a portion of the SHO functions performed by SHO function 214 of RNC 110 of the prior art. For example, SHO function 318 of each BTS 301, 303, 304 in the Active Set of the MS 1014 performs SHO functions such as such as frame selection and signaling of a new data indicator which serves as an ARQ flush command. Each BTS 301-307 further includes a scheduler, or scheduling function, 316 that also resided in the RNC 110 of the prior art. As a result, each Active Set BTS, such as BTSs 301, 303, and 304 with respect to MS 1014, can choose to schedule the associated MS 1014 without need for communication to other Active Set BTSs based on scheduling information signaled by the MS to the BTS and local interference and SNR information measured at the BTS. By distributing scheduling functions 316 to the BTSs 301-307, there is no need for Active Set handoffs of a EUDCH in communication system 1000. The ARQ function 314 and AMC function, which functionality also resides in RNC 110 of communication system 100, are also distributed to BTSs 301-307 in communication system 1000. As a result, when a data block transmitted on a specific Hybrid ARQ channel has successfully been decoded by an Active Set BTS, the BTS acknowledges the successful decoding by conveying an ACK to the source MS, that is, MS 1014, without waiting to be instructed to send the ACK by RNC 1010.

Each Active Set BTS, that is, each of BTSs 301, 303, 304, schedules its respective EUDCH with the MS served by the BTS, that is, MS 1014, using a shorter frame interval, for example, 2 milliseconds (ms), while the control information is split between shorter and longer frame interval, for example, 2 ms and 10 ms frame intervals, to minimize SNR and thereby reduce interference. That is, control information that requires more frequent or continuous reporting by the MS uses larger frame sizes, such as 10 ms, which reduces interference. Control information that is sent less often or only when a user, that is, an MS, is scheduled is sent in a shorter frame interval that matches the enhanced uplink frame interval, such as 2 ms, which reduces latency.

In order to allow each Active Set BTS 301, 303, 304 to decode each EUDCH frame, MS 1014 conveys to each Active Set BTS, in association with the EUDCH frame, modulation and coding information, incremental redundancy version information, H-ARQ status information, and transport block size information, which information is collectively referred to as transport format and resource-related information (TFRI). In another embodiment of the present invention, the TFRI only defines rate and modulation coding information and H-ARQ status. Preferably, MS 1014 codes the TFRI and sends the TFRI over the same frame interval as the EUDCH.

By providing MS 1014 signaling of the TFRI corresponding to each enhanced reverse link transmission to the Active Set BTSs 301, 303, 304, communication system 1000 supports H-ARQ, AMC, active set handoff, and scheduling functions in a distributed fashion. As described in greater detail below, by moving control functions to the BTSs 301-307 that were supported by an RNC, such as RNC 110, in the prior art, communication system 1000 allows Active Set BTSs 301, 303, 304 to perform time-based and SNR-based H-ARQ flush functions during soft handoff (SHO), provides an efficient control channel structure to support scheduling, H-ARQ, AMC functions for an enhanced reverse link, or uplink, channel in order to maximize throughput, and enables a MS in a SHO region to choose a scheduling assignment corresponding to the best TFRI out of multiple assignments it receives from multiple active set BTS. As a result, communication system 1000 allows uncoordinated, that is, no explicit communication between Active Set BTSs 301, 303, 304, scheduling of an enhanced uplink channel (EUDCH) during SHO while supporting H-ARQ and AMC and still achieving macro-selection diversity and upfade scheduling benefit.

Figure 4:
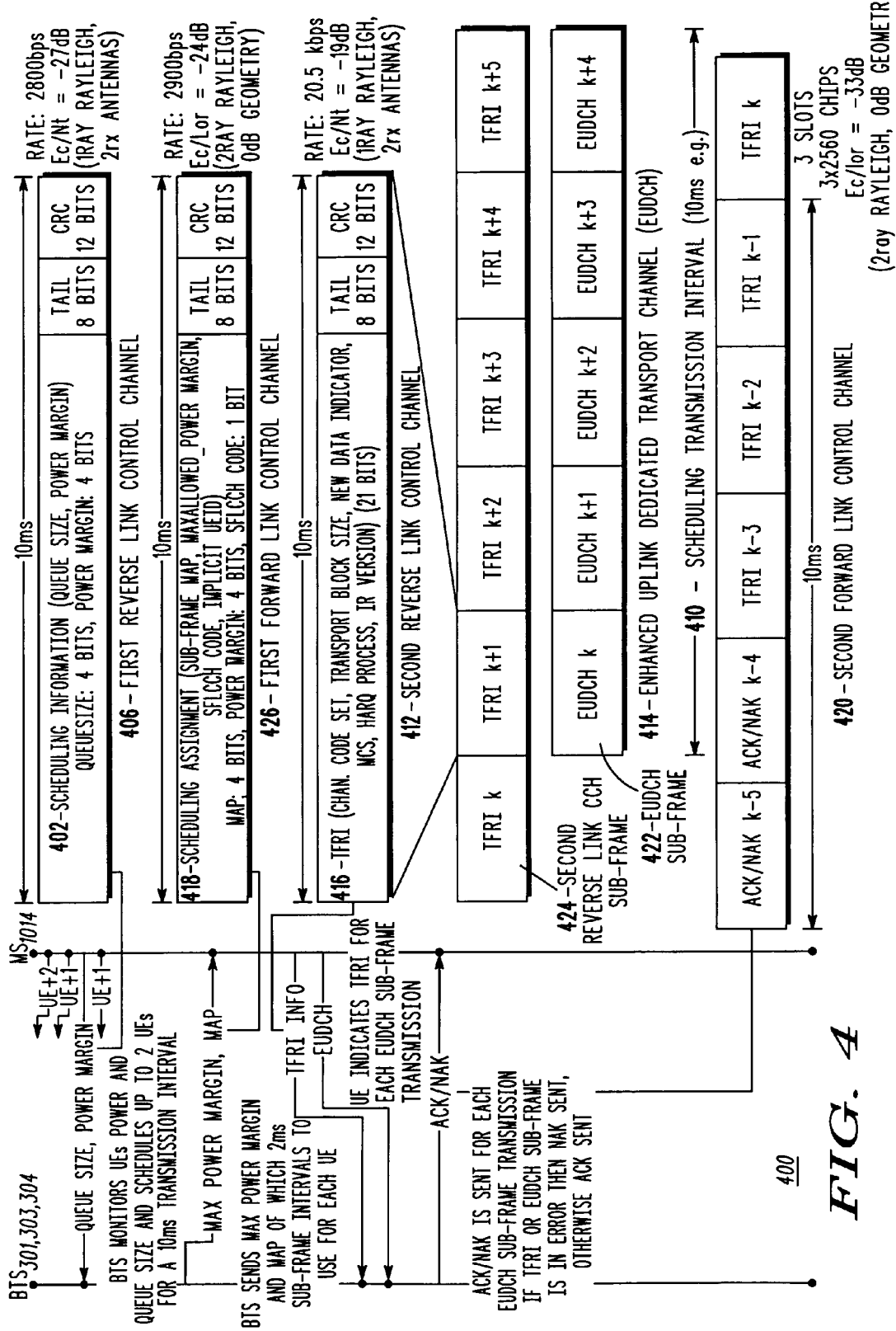
FIG. 4 is a message flow diagram with frame format information in accordance with an embodiment of the present invention.

Referring now to FIG. 4, a message flow diagram 400 illustrates an exchange of communications between an MS of communication system 1000, such as MS 1014, and each of the multiple BTSs included in an Active Set of the MS, that is, BTSs 301, 303, and 304, in accordance with an embodiment of the present invention. MS 1014 communicates scheduling information 402 to each Active Set BTS 301, 303, 304 using a first reverse link control channel 406 with a known fixed modulation and coding rate and transport block size. A corresponding code assignment for the first reverse link control channel is done on a semi-static basis. Preferably, MS 1014 does not transmit control information when the MS's corresponding data queue is empty.

Each Active Set BTS 301, 303, 304 receives scheduling information 402 from the MS 1014 serviced by the BTS via the first reverse link control channel 406. The scheduling information 402 may include the data queue status and the power status of the MS. In another embodiment of the present invention, the data queue status may account for queued layer 3 signaling as well as queued data. In yet another embodiment of the present invention, the scheduling information 402 may further include a type field in which either the data queue status or the power status can be sent.

Based on the scheduling information 402 received from each MS serviced by a BTS, each serving, or Active Set, BTS 301, 303, 304 schedules one or more of the MSs serviced by the BTS, that is, MS 1014, for each scheduling transmission interval 410. In one embodiment of the present invention, the scheduling transmission interval 410 is 10 ms, which scheduling transmission interval is broken up into five 2 ms sub-frames 422. Each MS serviced by the BTS, such as MS 1014 with respect to BTS 301, transmits on 2 ms sub-frames on each of a second reverse control channel 412 and a EUDCH 414 in order to reduce signaling and therefore reduce signaling interference overhead. By having the 10 ms scheduling transmission interval 410 broken up into five 2 ms sub-frames 422, a serviced MS, such as MS 1014, can optimize the rate (TFRI) based on the most current channel conditions while at the same time minimizing control channel interference by allowing some control information, such as scheduling information 402, to be sent at 10 ms intervals, such as the interval for first reverse link control channel 406, instead of at 2 ms sub-frame intervals, such as the sub-frame interval 424 for second reverse link control channel 412.

Each Active Set BTS 301, 303, 304 uses reverse link interference level, MS scheduling information 402, and power control information to determine a maximum allowed power margin target for each MS, such as MS 1014, serviced by the BTS. Power margin is the difference between a current Dedicated Physical Control Channel (DPCCH) power level and the maximum power level supported by the MS. The pilot is a reverse link channel that is used for demodulation purposes such as automatic frequency control, synchronization, and power control. For example, in a WCDMA system this channel is part of the DPCCH. In another embodiment of the present invention, a maximum power level target may be determined instead of a power margin target. In yet another embodiment of the present invention, a maximum EUDCH to DPCCH (or EUDCH to pilot) power ratio target is determined instead of a power margin target.

Upon choosing an MS, such as MS 1014, to be scheduled, each Active Set BTS 301, 303, 304 conveys a scheduling assignment 418 to the chosen MS, that is, MS 1014, on a first forward link control channel 426. In one embodiment of the present invention, the scheduling assignment 418 consists of the maximum allowed 'power margin' target and a map of the allowed EUDCH sub-frame transmission intervals, such as a 2 ms sub-frame interval, for the next 10 ms transmission interval using a first forward link control channel 426. FIG. 12 illustrates an example of the map included in the scheduling assignment 418 (FIG. 4). Column 1205 comprises a set of state indicators showing which EUDCH sub-frames that MS 1014 can use during an assigned scheduling transmission interval 1210, for example scheduling transmission interval 410 of FIG. 4. In another embodiment of the present invention, the scheduling assignment 418 of FIG. 4 may further include a physical channel Walsh code assignment, also referred to herein as a second forward link control channel code (SFLCCH_code) of a second forward link control channel (SFLCCH) 420 of FIG. 4. In yet another embodiment of the present invention, the map may also include a TFRI assignment for each EUDCH sub-frame, that is, a TFRI sub-frame corresponding to each EUDCH sub-frame. An example of such a map is shown in FIG. 13, which again includes the column of state indictors 1205 and a column of TFRI values 1315. Each Active Set BTS 301, 303, 304 also uses the second forward link control channel 420 to convey ACK/NAK information to the MS related to the MS's EUDCH sub-frame transmissions.

Each Active Set BTS 301, 303, 304 creates an MS identifier (ID) that is uniquely associated with an MS serviced by the BTS, that is MS 1014, for the first forward link control channel 426. The BTS creates the MS ID by running an n-bit ID that is uniquely associated with the MS (and known at the MS and the Active Set BTSs) through a CRC generator at the BTS. Use of the MS ID by the BTS allows the associated MS to determine when the scheduling assignment 418 sent on the first forward control channel 426 is meant for the MS. In one embodiment of the present invention, the first forward link control channel 426 uses the 10 ms frame format depicted in FIG. 4, which format includes a scheduling assignment 418, tail bits, and a CRC. In another embodiment of the present invention, the first forward link control channel 426 frame size may use a frame format of 2 ms. The first forward link control channel 426 is staggered to avoid additional latency.

An MS in a SHO region, such as MS 1014, may receive one or more scheduling assignments 418 from one or more Active Set, or serving, BTSs 301, 303, 304. When the MS receives more than one scheduling assignment, the MS may select a scheduling assignment 418 corresponding to the best TFRI. The MS determines the TFRI for each EUDCH sub-frame 422 based on the interference information (maximum allowed power margin) from the selected scheduling assignment 418 and the current scheduling information 402 measured at the MS, that is, current data queue and power status or power margin. The MS then enables a fast power control function and the feedback rate is then performed on a slotby-slot basis, for example, 1500 Hz in the case of 3GPP UMTS. The MS then transmits the EUDCH sub-frame 422 to the Active Set BTSs 301, 303, 304 using the selected TFRI.

In another embodiment of the present invention, an MS, such as MS 1014, in a soft-handoff region may monitor a first forward link control channel 426 and a second forward link control channel 420 from at least one of the Active Set BTSs 301, 303, 304. The forward link control channels monitored by the MS may include a Dedicated Physical Data Channel (DPDCH)/DPCCH or associated dedicated physical channel (DPCH), the control channels corresponding to High Speed Downlink Shared Channel (HS-DSCH), that is, High Speed Shared Control Channel (HS-SCCH), and first 426 and second 420 forward link control channels corresponding to EUDCH transmission. The MS in the soft-handoff region may then choose a scheduling assignment 418 corresponding to a best TFRI out of multiple scheduling assignments it receives from multiple Active Set BTS control channels transmitting EUDCH information.

In addition to conveying the EUDCH sub-frame 422 to the Active Set BTSs 301, 303, 304, the MS serviced by the BTSs, that is, MS 1014, also conveys a TFRI 416 associated with the transmitted EUDCH sub-frame. The TFRI 416 provides each receiving BTS with the information required to demodulate and decode the associated EUDCH sub-frame. For example, referring again to FIG. 4, a TFRI sub-frame 'TFRI k' corresponds to a EUDCH sub-frame 'EUDCH k,' a TFRI sub-frame 'TFRI k+1' corresponds to a EUDCH sub-frame 'EUDCH k+1,' a TFRI sub-frame 'TFRI k+2' corresponds to a EUDCH sub-frame 'EUDCH k+2,' and so on. In one embodiment of the present invention, the TFRI 416 is conveyed by MS 1014 via the second reverse link control channel 412 using a 2 ms frame interval, that is, a sub-frame interval. As depicted in FIG. 4, the second reverse link control channel 412 sub-frame includes TFRI information, tail bits, and CRC bits. In another embodiment of the present invention, the TFRI 416 may be conveyed via the EUDCH 414 with a known, fixed modulation and coding that is implemented either by puncturing the data bits or as a preamble or a midamble. In yet another embodiment of the present invention, the TFRI 416 may not be sent. For example, there may be no second reverse control channel, and blind detection of the TFRI is performed at each Active Set, or serving, BTS 301, 303, 304.

Referring now to FIG. 5A, an exchange of communications between an MS, such as MS 1014, and a serving BTS 301, 303, 304 is illustrated in accordance with another embodiment of the present invention. As depicted by FIG. 5A, a EUDCH 414 that includes EUDCH sub-frames is used by the MS to convey traffic data to the BTS. A second reverse link control channel 512 is used by an MS, such as MS 1014, to transmit TFRI data corresponding to the EUDCH sub-frames to the BTS. Again, the TFRI data conveyed by the MS is used by the receiving BTS to demodulate and decode the associated EUDCH sub-frames. However, unlike sub-frames 424 of second reverse link control channel 412, a sub-frame 524 of second reverse link control channel 512 includes a first part 502 and second part 504. The MS may include in the first part 502 of sub-frame 524 the channelization code set and modulation (MCS) information and may further include tail bits which can be used to determine which demodulation resources including spreading factor are used with the EUDCH. The MS may include in the second part 504 of sub-frame 524 one or more of a transport block size, a new data indicator, and H-ARQ and IR information. By including a first part 502 in a sub-frame 524 of second reverse link control channel 512, a receiving BTS is allowed to avoid speculative decoding before the EUDCH sub-frame starts at a time interval 't1' 506 after the end of the first part 502, therefore requiring fewer demodulation resources be applied to the EUDCH.

Figure 5B:
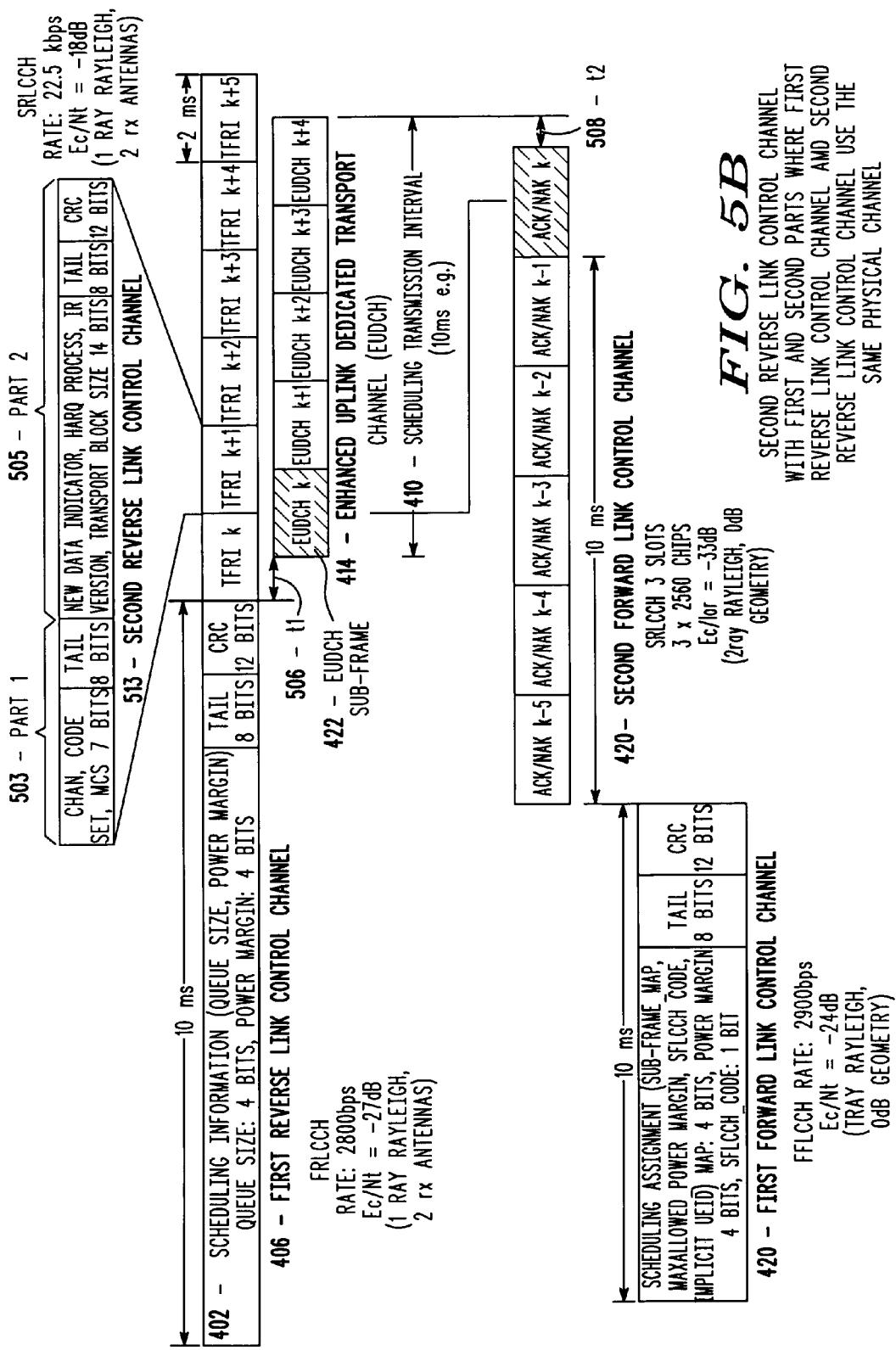
FIG. 5B is a block diagram of a first reverse link control channel, a second reverse link control channel, a first forward link control channel, a second forward link control channel, and an enhanced uplink dedicated transport channel in accordance with another embodiment of the present invention.
Figure 6:
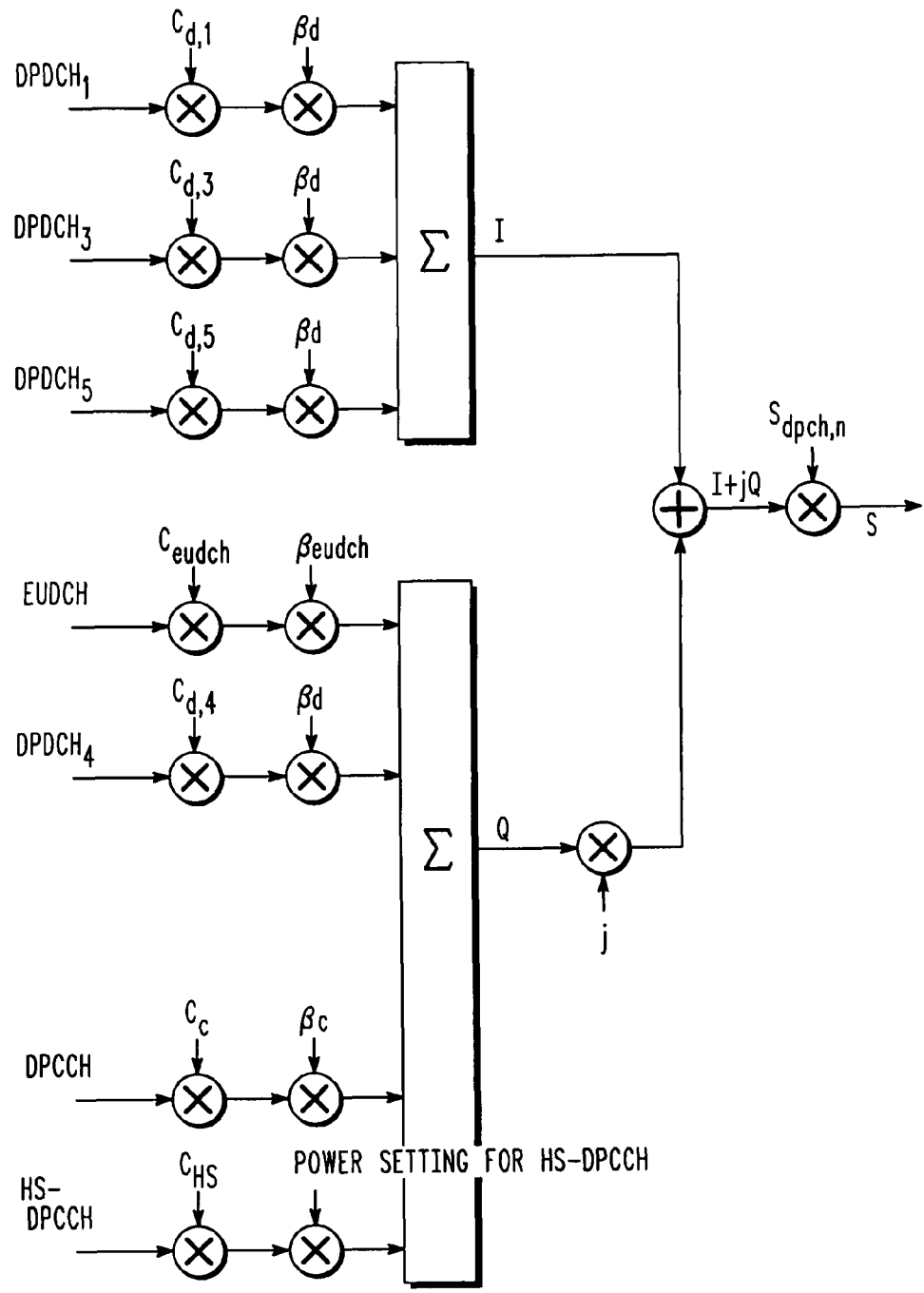
FIG. 6 is exemplary configuration of a spreading configuration for reverse link (or uplink) DPCCHs, DPDCHs, and EUDCH and associated reverse link control channels in accordance with an embodiment of the present invention.
Figure 7:
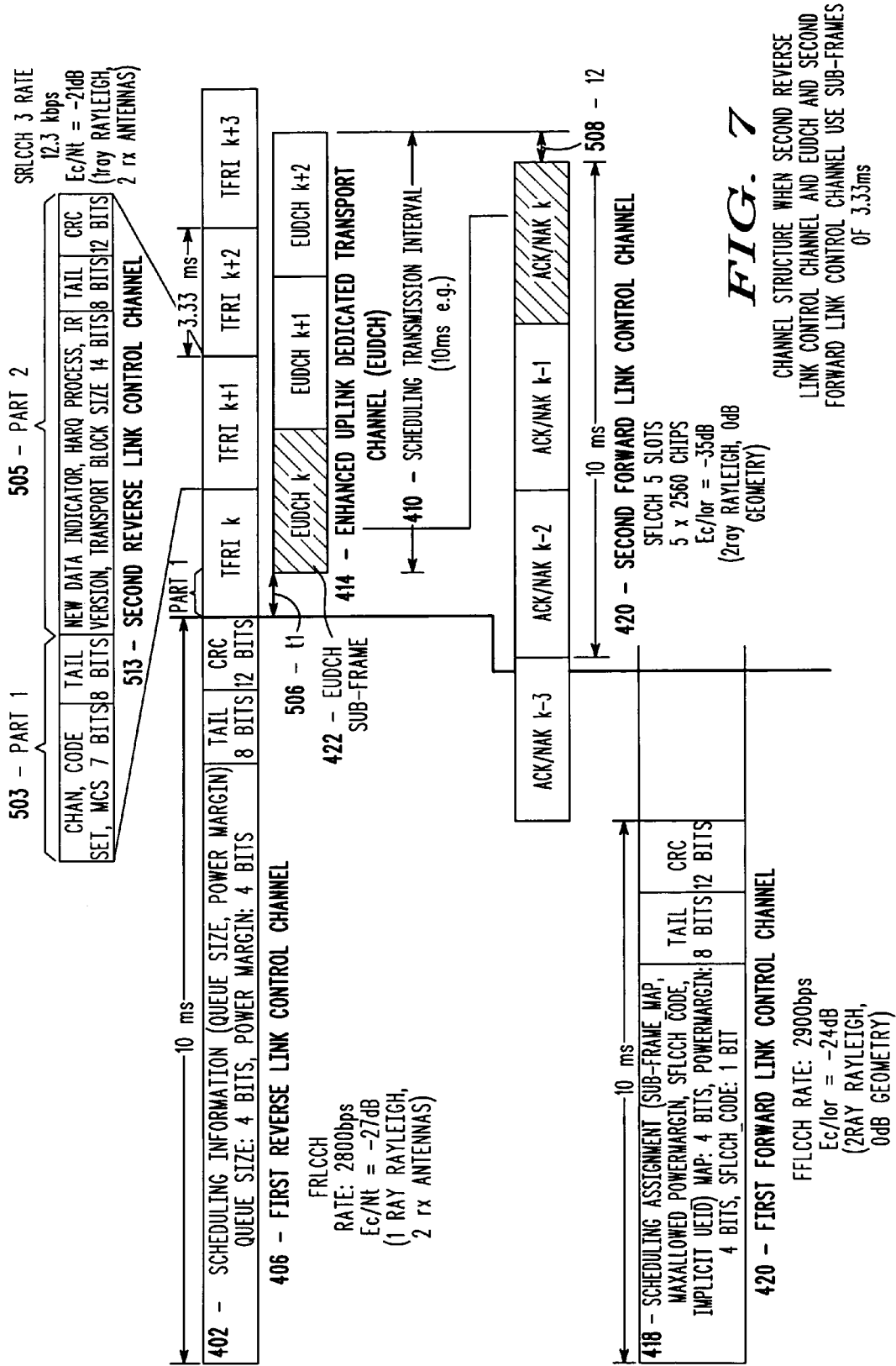
FIG. 7 is a block diagram of a first reverse link control channel, a second reverse link control channel, a first forward link control channel, a second forward link control channel, and an enhanced uplink dedicated transport channel in accordance with another embodiment of the present invention.

Referring now to FIG. 5B, an exchange of communications between an MS, such as MS 1014, and a serving BTS 301, 303, 304 is illustrated in accordance with yet another embodiment of the present invention. A second reverse link control channel 513 depicted in FIG. 5B is used by an MS, such as MS 1014, to transmit TFRI data to a serving BTS. Similar to second reverse link control channel 512 of FIG. 5A, second reverse link control channel 513 of FIG. 5B includes a first part 503 and second part 505. However, unlike second reverse link control channel 512 of FIG. 5A, second reverse link control channel 513 is transmitted in a same physical channel as the first reverse link control channel 406. The 10 ms frame format of the first reverse link control channel 406 is used for the second reverse link control channel 513 when there is no 10 ms scheduled transmission interval 410, and the 2 ms frame format of the second reverse link control channel 513 is used when there is a 10 ms scheduled transmission interval 410 for the MS. Referring now to FIG. 7, in still another embodiment of the present invention, a sub-frame size for each of the EUDCH 414, the second reverse link control channel 513, and the second forward link control channel 420 may be 3.33 ms instead of 2 ms.

Referring now to FIGS. 4, 5A, 5B, and 7, upon receiving a EUDCH sub-frame 422, which sub-frame includes traffic data among other information, for a given H-ARQ channel and further receiving associated TFRI data, a receiving BTS 301, 303, 304 demodulates and decodes the data in the EUDCH sub-frame. The BTS combines the resulting EUDCH soft decision information and stores the information, including the decoded and demodulated traffic data, in a traffic data buffer, preferably a H-ARQ buffer of the BTS, along with traffic data from previous and subsequent transmissions until the data included in a received EUDCH sub-frame 422 successfully decodes. Upon successfully decoding the received EUDCH sub-frame, the receiving BTS conveys an ACK to the MS that sourced the EUDCH sub-frame, that is, MS 1014, via the second forward link control channel 420. When the receiving BTS is unable to successfully decode the received EUDCH sub-frame, the BTS conveys a NACK, via the second forward link control channel 420, to the MS that sourced the EUDCH sub-frame.

When an MS, such as MS 1014, receives an ACK from a BTS, such as Active Set BTSs 301, 303, 304, the MS sets a new data indicator bit in the next uplink TFRI message sent on the second reverse link control channel 412, 512, 513. The new indicator bit informs each Active Set BTS 301, 303, 304 that the EUDCH sub-frame has been successfully decoded and is interpreted by the BTS as a H-ARQ flush command for the corresponding H-ARQ channel. That is, in response to receiving the new indicator bit, each Active Set BTS 301, 303, 304 flushes the H-ARQ buffer for the corresponding current H-ARQ channel of the MS sourcing the new indicator bit, that is, MS 1014. The BTS then fills the H-ARQ buffer with soft decision information corresponding to a new EUDCH transmission.

In another embodiment of the present invention, each Active Set BTS 301, 303, 304 starts a timer that measures an expiration of a predetermined period of time after receiving a first transmission of an EUDCH sub-frame in error. In still another embodiment of the present invention, the BTS may start the timer after sending control data, such as a scheduling assignment 418, on the first forward link control channel 426. When the timer expires before the BTS schedules a re-transmission of the erroneously received EUDCH sub-frame, or before the BTS receives second control data such as a TFRI sub-frame 424 via second reverse link control channel 412, or before the BTS receives a re-transmission of the EUDCH sub-frame scheduled by another Active Set BTS, or before an occurrence of any combination of the above, the BTS flushes the traffic data buffer, that is, the H-ARQ soft decision buffer, maintained by the BTS in association with the MS conveying the EUDCH sub-frame. In yet another embodiment of the present invention, in addition to or instead of flushing the H-ARQ buffer upon expiration of the timer, the BTS may flush the H-ARQ buffer associated with an MS when the BTS determines that the buffer has been corrupted due to received data with unacceptably low received SNR.

An Active Set BTS 301, 303, 304 determines whether an MS, such as MS 1014, (with an Active Set that includes more than one BTS) should be considered for scheduling contention or whether the MS's EUDCH transmissions should be demodulated and decoded and stored in a H-ARQ buffer based on a link quality metric, such as a local uplink pilot signal-to-interference ratio (SIR), or a downlink SIR metric such as the channel quality indicator (CQI) which is feedback as part of release 5 WCDMA for the High speed downlink packet access (HSDPA) feature set, or a signal strength metric signaled by RNC 1010, or both an SIR and a signal strength metric. In one embodiment of the present invention, the signal strength metric may selected from the reverse link signal strength information received periodically from each of the Active Set BTSs 301, 303, 304. For example, the signal strength metric may be computed as 'RSSI (Received Signal Strength Indication),' or just pilot SIR. However, those who are of ordinary skill in the art realize that there are many methods for determining link quality metrics and a signal strength metric that may be used herein without departing from the spirit and scope of the present invention. The BTS may also use the SIR or signal strength metric to avoid adding corrupt or unusable soft decision information to the H-ARQ buffer due to poor SNR. Furthermore, an Active Set BTS 301, 303, 304 may not transmit a scheduling assignment 418 to a served MS 1014 if the signal strength or SIR metric is poor. In another embodiment of the present invention, a local reverse link pilot SIR may be compared to an inner loop setpoint determined by outer loop power control to determine if the BTS should consider the MS for scheduling contention or transmitting scheduling assignments 418.

In another embodiment of the present invention, when there is more than one Active Set BTS, a BTS of the Active Set BTSs may not allocate demodulation resources for the EUDCH or the first and second reverse link control channels if the signal strength or SIR metric is poor for some time period. For example, FIG. 11 is a block diagram of a received signal path 1100 of a BTS, such as BTSs 301-307, in accordance with an embodiment of the present invention. Received signal path 1100 includes a receiver unit 1120 and a signal processing unit 1130. Receiver unit 1120 receives a signal from a transmitting MS, such as MS 1014, via an antenna.

Receiver unit 1120 includes a low noise amplifier (LNA) 1102, a demodulator 1104 coupled to LNA 1102, and an analog-to-digital converter (A/D) 1106 coupled to demodulator 1104. The received signal is routed to LNA 1102. LNA 1102 amplifies the received signal and routes the amplified signal to demodulator 1104. Demodulator 1104 demodulates the amplified signal to produce a baseband signal and routes the baseband signal to A/D 1106. A/D 1106 digitizes the baseband signal at a predetermined sampling rate to produce a digitized baseband signal that includes multiple signal samples. The digitized baseband signal is then routed to signal processing unit 1130.

Signal processing unit 1130 includes a filter, or filtering process, that includes a pulse-shaping filter 1108 coupled to an interpolation filter 1110. Signal processing unit 1130 routes the digitized baseband signal received from receiver unit 1120 to pulse-shaping filter 1108. Pulse-shaping filter 1108 is a multiple tap finite impulse response (FIR) filter that filters the digitized baseband signal to match the transmitted filter spectrum and to reduce interchip interference by approximating a Nyquist pulse. Pulse-shaping filter 1108 filters the digitized baseband signal to produce a filtered digitized signal.

The filtered digitized signal is then routed to interpolation filter 1110. Interpolation filter 1110 interpolates the filtered digitized signal received from filter 1108 to produce a stream of signal samples at a desired sampling rate with minimal distortion of a frequency spectrum of the signal. The stream of signal samples is then routed to one of the multiple component demodulation resources 1112-1114 of signal processing unit 108. In an embodiment of the present invention, the BTS allocates a separate demodulation resource 1112-1114 to each reverse link control channel and reverse link traffic channel, including the EUDCH, involved in communications between the BTS and an MS, that is, MS 1014, served by the BTS.

When there is more than one Active Set BTS, a BTS of the Active Set BTSs may not allocate a demodulation resource 1112-1114 of the BTS for demodulation of the EUDCH or the first and second reverse link control channels if the signal strength or SIR metric is poor for some time period. Alternatively, when there is more than one Active Set BTS, a BTS of the Active Set BTSs may not allocate demodulation resources 1112-1114 for the EUDCH or the first and second reverse link control channels if the local reverse link pilot SIR drops below the inner loop setpoint determined by the outer loop power control metric is poor for some time period.

Furthermore, when an Active Set BTS 301, 303, 304 determines that a link quality metric determined by the BTS is less than a link quality metric threshold, the BTS may deallocate a demodulation resource 1112-1114 allocated to a first reverse link control channel associated with served MS 1014 while maintaining allocation of demodulation resources 1112-1114 associated with a second reverse link control channel that is associated with the MS. In another embodiment of the present invention, an Active Set BTS 301, 303, 304 transmits first control data to MS 1014 on a forward link control channel and starts a timer upon transmitting the first control data. When a predetermined period of time expires, as measured by the timer, prior to the BTS receiving second control data from the MS on a reverse link control channel, the BTS may deallocate demodulation resources 1112-1114 allocated to a first reverse link control channel associated with the MS while maintaining allocation of demodulation resources 1112-1114 associated with a second reverse link control channel that is associated with the MS.

Figure 8:
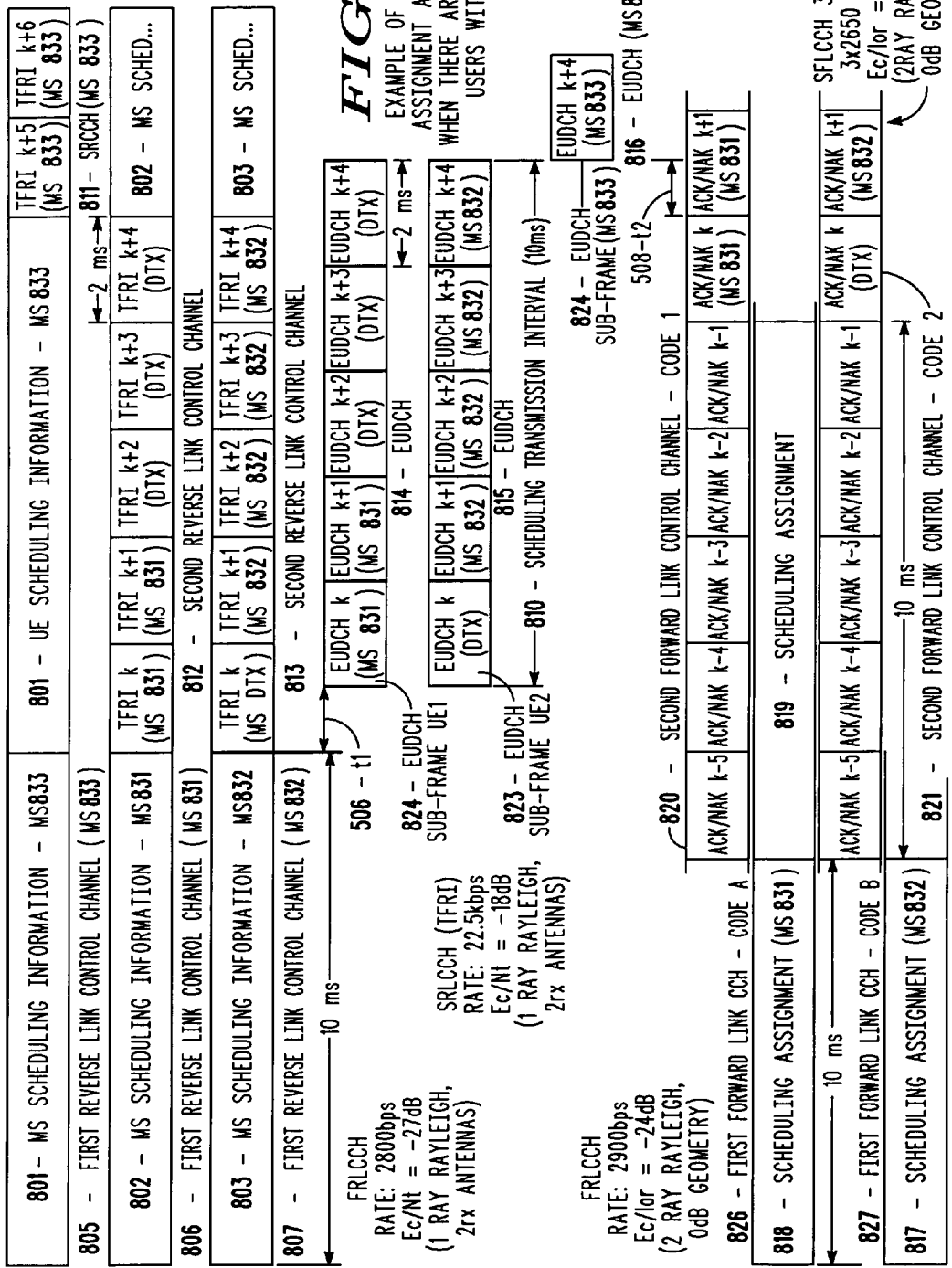
FIG. 8 is a block diagram showing control channel and data channel usage and assignment when there are multiple users served by a single base station in accordance with another embodiment of the present invention.

Referring now to FIG. 8, an exchange of communications between multiple MSs 831, 832, and 833 and a same BTS 840 serving each MS of the multiple MSs 831-833 is illustrated in accordance with still another embodiment of the present invention. Each MS of the multiple MSs 831-833 communicates with BTS 840 via a reverse link that includes multiple reverse link control channels, a paging channel, and a reverse link traffic channel, and a forward link that includes multiple forward link control channels, a forward link traffic channel, and a EUDCH. MSs 831, 832, and 833 periodically, such as every 10 ms, send respective scheduling information 802, 803, 801 via respective first reverse link control channels 806, 807, 805 to serving BTS 840. BTS 840 uses the received scheduling information 802, 803, 801 and other information that is well known in the art, such as fairness criteria, to choose which MS of the multiple MSs 831-833 to schedule for each scheduling transmission interval 810. BTS 840 then sends a scheduling assignment to the scheduled MS.

For example, as depicted in FIG. 8, BTS 840 first schedules both MS 831 and MS 832 by sending a scheduling assignment 818 to MS 831 on a first forward link control channel 826 using a first physical channel with a first orthogonal code 'A' and sending a scheduling assignment 817 to MS 832 on another first forward link control channel 827 using a second physical channel with a second orthogonal code 'B.' MS 831 detects its scheduling assignment 818 on first forward link control channel 826 and MS 832 detects its scheduling assignment 817 on first forward link control channel 827.

Based on scheduling assignment information and current local scheduling information, MS 831 chooses a TFRI for an EUDCH sub-frame k. MS 831 transmits the selected TFRI on its second reverse link control channel 812 and then transmits the data corresponding to the selected TFRI in EUDCH sub-frame k via EUDCH 814. Based on scheduling assignment information and current local scheduling information, MS 832 transmits DTXs on TFRI sub-frame k and EUDCH sub-frame k. MS 831 and MS 832 then choose their respective TFRI's for their respective sub-frames k+1. Each of MS 831 and MS 832 then transmits the selected TFRI in a respective TFRI sub-frame k+1 via a respective second reverse link control channel 812, 813 and then transmits data corresponding to the selected TFRI via respective EUDCH 814, 815 in a respective EUDCH sub-frame k+1. Transmission of TFRI and EUDCH sub-frames continues until the end of each of MS 831 and 832's scheduling transmission interval 810.

Previously, BTS 840 sent a scheduling assignment 819 to MS 833 on the first forward link control channel 826 such that the MS is scheduled for a next scheduling transmission interval (after MS 831 and MS 832). In the next scheduling transmission interval, MS 833 begins to send TFRI via the MS's second reverse link control channel 811 and then sends data via the MS's EUDCH 816. Meanwhile, BTS 840 sends ACK/NAK information via second forward link control channel 820 to MS 831 and further sends ACK/NAK information via second forward link control channel 821 to MS 832. Eventually, BTS 840 also sends ACK/NAK information via second forward link control channel 820 to MS 833.

Figure 9:
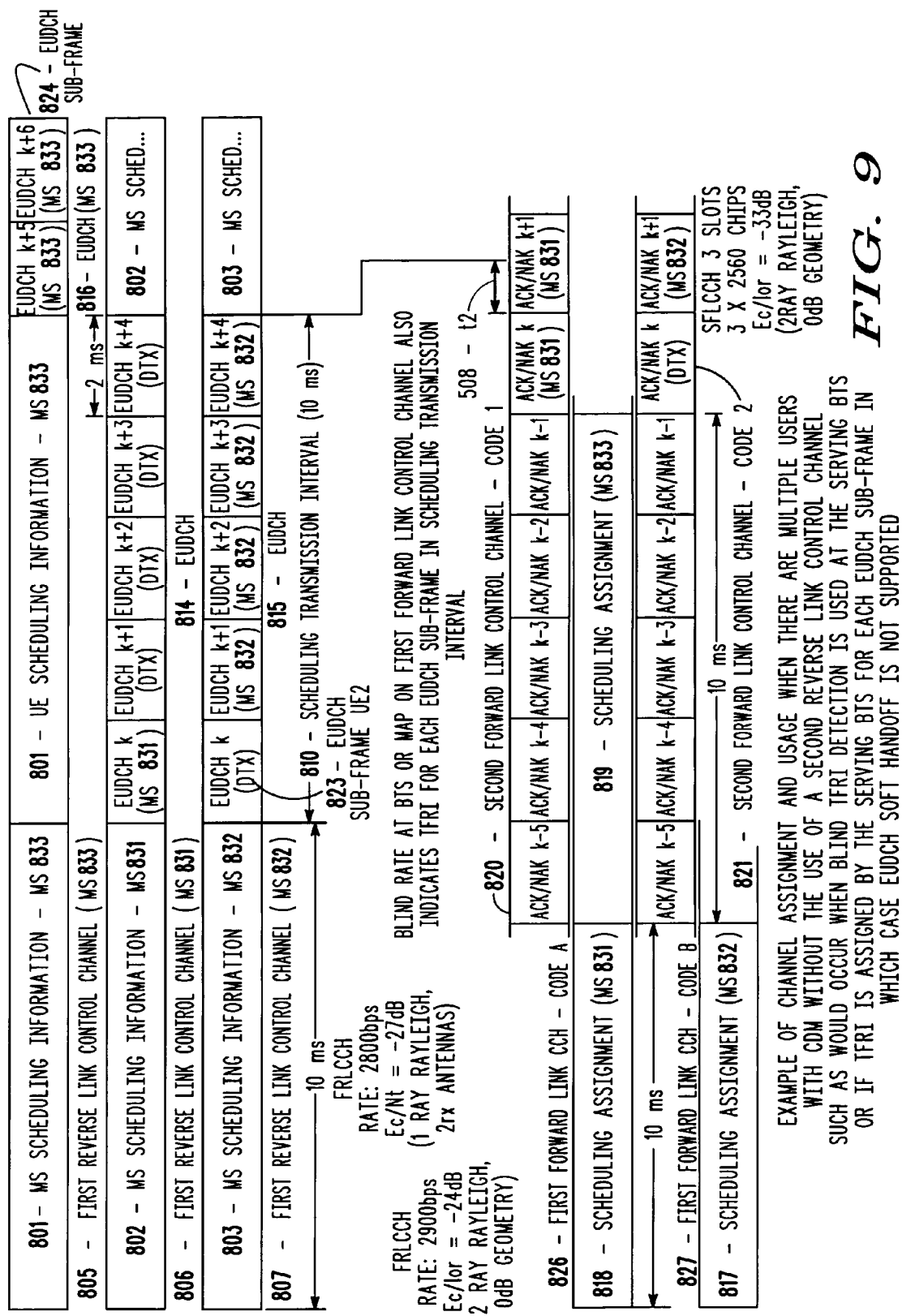
FIG. 9 is a block diagram showing control channel and data channel usage and assignment when there are multiple users served by a single base station in accordance with another embodiment of the present invention.
Figure 10:
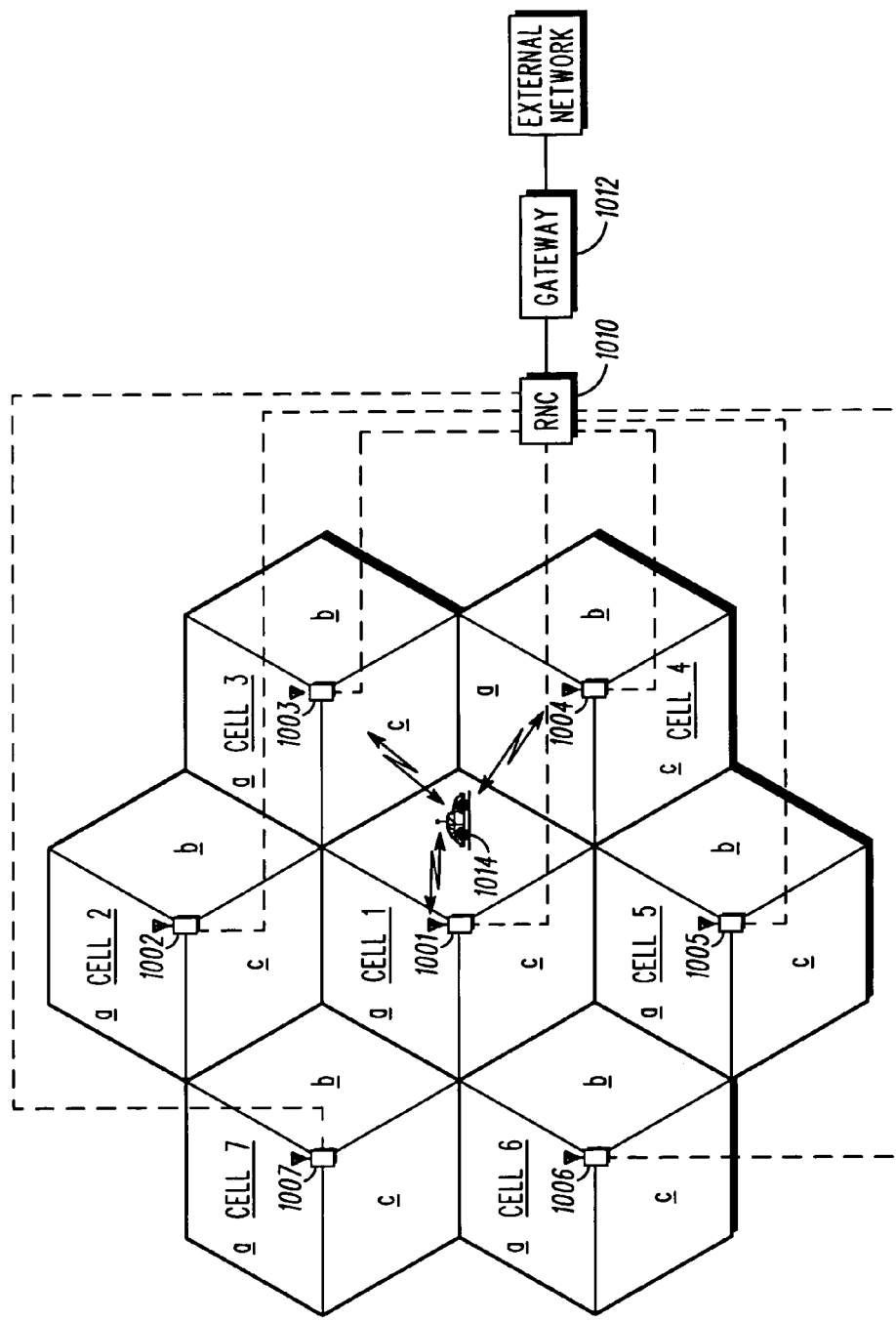
FIG. 10 is a block diagram of a communication system in accordance with an embodiment of the present invention.

Referring now to FIG. 9, another embodiment of channel assignment and usage is illustrated where blind rate TFRI detection is used at the serving BTS 840 or where the serving BTS assigns to a scheduled MS 831-833 what TFRI to use for each EUDCH sub-frame of the scheduling transmission interval 810. In one embodiment of the present invention, where serving BTS 840 assigns to an MS 831-833 what TFRI to use, the MS does not transmit the TFRI it received from the selected serving BTS scheduling assignment 817, 818, 819 on the first forward link control channel 826, 827, in which case soft handoff for the EUDCH is not supported. In another embodiment of the present invention, where EUDCH soft handoff is supported when BTS 840 assigns to an MS 831-833 the TFRI for each EUDCH sub-frame, the MS transmits, or 'echos back,' the TFRI received by the MS from the selected serving BTS scheduling assignment 817, 818, 819 via the first forward link control channel 826, 827 using a second reverse link control channel 812, 813.

In summary, by allowing a mobile station (MS) to signal control information of each enhanced reverse link transmission to Active Set base stations, or base transceiver stations (BTSs), and by allowing the BTSs to perform control functions that were supported by an RNC in the prior art, communication system 1000 is able to support H-ARQ, AMC, active set handoff, and scheduling functions in a distributed fashion. By providing a distributed network architecture and an efficient control channel structure that supports scheduling, H-ARQ, AMC functions for an enhanced reverse link, or uplink, channel, communication system 1000 is further able to support time-based and SNR-based H-ARQ flush functions at the BTSs during soft handoff (SHO), to permit an MS in a SHO region to choose a scheduling assignment corresponding to a best TFRI out of multiple scheduling assignments that the MS receives from the BTSs, and to allow uncoordinated, that is, no explicit communication between the BTSs, scheduling of the enhanced uplink channel during SHO while supporting H-ARQ and AMC.

Communication system 1000 achieves reverse link upfade scheduling benefit at Active Set BTSs for users, or MSs, in a multi-cell coverage, that is, in a SHO region, without requiring inter-BTS communication. Communication system 1000 does not require Active Set BTS handoffs of the enhanced reverse link channel, and communication system 1000 achieves macro-selection diversity benefits while performing fast BTS scheduling of packet data without requiring communication between a centralized selection function, such as RNC 110 in communication system 100, and the Active Set BTSs.

The enhanced reverse link channel (EUDCH) of communication system 1000 benefits from fast H-ARQ by taking advantage of frame re-transmissions by soft combining them with previous transmissions. The enhanced reverse link channel also benefits from fast scheduling at low doppler since it is possible to track Rayleigh fading and schedule on constructive fades (upfade scheduling) thus deriving a significant system throughput benefit. Because Rayleigh fading is uncorrelated between the uplink and downlink due to frequency band separation (common for frequency division duplexed (FDD) systems), scheduling functions for uplink and downlink within a cell or BTS can be independent. Also due to differences in antenna downtilt and other RF equipment issues it is possible that an Active Set BTS with the best downlink is different from an Active Set BTS with the best uplink for an MS in a multi-coverage area. Due to Rayleigh fading, an Active Set BTS with the best uplink for a given user in multi-coverage areas may vary also at the fading rate. In multi-coverage regions, communication system 1000 obtains a macro-selection diversity benefit even while supporting fast scheduling of packet data with low latency and low bit error rate (10-6) requirements by each Active Set BTS that receives the enhanced uplink frame of a given MS acknowledging when the frame is decoded successfully or otherwise sending a NAK.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for scheduling mobile station uplink transmissions by a base station comprising steps of:
   receiving scheduling information from a mobile station, wherein the scheduling information comprises at least one of a queue status and a power status of the mobile station;
   determining an uplink channel scheduling assignment for the mobile station using at least one of the scheduling information and a base station interference metric and a link quality corresponding to the mobile station;
   transmitting the uplink channel scheduling assignment to the mobile station, wherein the uplink channel scheduling assignment comprises a maximum traffic channel to control channel power ratio that the mobile station is allowed to use in a subsequent reverse link transmission;
   selecting, by the mobile station, transport format and resource-related information (TFRI) for an uplink transmission, wherein the selection is based on the maximum traffic channel to control channel power ratio; and
   receiving, from the mobile station, an indication of the selected TFRI for an uplink transmission.

2. The method of claim 1, wherein the power status corresponds to a power level of a Dedicated Physical Control Channel (DPCCH).

3. The method of claim 1, wherein the power status is based on a difference between a Dedicated Physical Control Channel (DPCCH) power level and a maximum power level supported by the mobile station.

4. The method of claim 1, wherein the queue status corresponds to a size of a data queue.

5. The method of claim 4, wherein the queue status further indicates a size of a layer 3 signaling queue.

6. The method of claim 4, wherein the queue status further indicates that a layer 3 signaling queue is non-empty.

7. The method of claim 1, further comprising conveying base station interference information to the mobile station via a forward link control channel.

8. The method of claim 1, wherein the link quality is one or more of a link quality of an uplink channel from the mobile station and a link quality of a downlink channel from the base station to the mobile station.

9. The method of claim 1, further comprising:
   receiving, from the mobile station, a first transmission of data, which transmission of data is conveyed by the mobile station during the transmission interval and comprises transport format and resource-related information (TFRI);
   decoding the first transmission of the data;
   when the first transmission of the data is not successfully decoded, receiving communications from the mobile station corresponding to at least one retransmission of the data;
   combining each of the at least one retransmission of the data with the previously received data to produce combined data until the first to occur of a successful decoding of the combined data or a flushing of a Hybrid Automatic Repeat Request (H-ARQ) buffer;
   when one of the first transmission of data and the combined data is successfully decoded, conveying an acknowledgment to the mobile station; and
   in response to conveying the acknowledgment, flushing the H-ARQ buffer.

10. A method for scheduling a mobile station transmission comprising:
    scheduling, by a base station of a plurality of base stations, a mobile station of a plurality of mobile stations for a transmission interval based on scheduling information received from each mobile station of the plurality of mobile stations and further based on a link quality metric;
    conveying base station interference information to the selected mobile station via a forward link control channel;
    receiving, by the base station from the scheduled mobile station, a first transmission of data, which transmission of data is conveyed by the mobile station during the transmission interval and comprises transport format and resource-related information (TFRI);
    decoding the first transmission of the data;
    when the first transmission of the data is not successfully decoded, receiving, by the base station, communications from the scheduled mobile station corresponding to at least one retransmission of the data;
    combining, by the base station, each of the at least one retransmission of the data with the previously received data to produce combined data until the first to occur of a successful decoding of the combined data or a flushing of a Hybrid Automatic Repeat Request (H-ARQ) buffer;
    when one of the first transmission of data and the combined data is successfully decoded, conveying an acknowledgment to the mobile station; and
    in response to conveying the acknowledgment, flushing the H-ARQ buffer.

11. The method of claim 10, wherein flushing the Hybrid Automatic Repeat Request (H-ARQ) buffer comprises in response to conveying the acknowledgment, receiving an instruction to flush the H-ARQ buffer and flushing the buffer.

12. The method of claim 10, further comprising, when the combined data is not successfully decoded prior to an expiration of a timer, flushing the Hybrid Automatic Repeat Request (H-ARQ) buffer.

13. The method of claim 10, further comprising:
    determining a reverse link power control metric;
    comparing the reverse link power control metric to an inner loop power control setpoint; and
    flushing the Hybrid Automatic Repeat Request (H-ARQ) buffer when the reverse link power control metric compares unfavorably with the inner loop power control setpoint.

14. The method of claim 10, further comprising:
    receiving a new data indicator; and
    flushing the Hybrid Automatic Repeat Request (H-ARQ) buffer based on a state of the received data indicator.

15. The method of claim 10, wherein the scheduling information is received via a first reverse link control channel and the transport format and resource-related information (TFRI) is received via a second reverse link control channel.

16. The method of claim 10, wherein the scheduling information is received via a first reverse link control channel and the transport format and resource-related information (TFRI) is blindly detected by a receiving base station.

17. The method of claim 10, wherein the scheduling information comprises power status and queue status information.

18. The method of claim 17, wherein the power status corresponds to a power level of a Dedicated Physical Control Channel (DPCCH).

19. The method of claim 17, wherein the power status is based on a difference between a Dedicated Physical Control Channel (DPCCH) power level and the maximum power level supported by the mobile station.

20. The method of claim 17, wherein the queue status information indicates a size of a layer 3 signaling queue.

21. The method of claim 17, wherein the queue status information indicates that a layer 3 signaling queue is non-empty.

22. The method of claim 10, further comprising conveying base station interference information to the selected mobile station via a forward link control channel.

23. The method of claim 22, further comprising mapping one or more sub-frames of the transmission interval to associated transport format and resource-related information (TFRI).

24. The method of claim 22, further comprising determining a maximum Enhanced Uplink Dedicated Transport Channel (EUDCH) to Dedicated Physical Control Channel (DPCCH) (DPPCH) power ratio for the mobile station based on base station interference information.

25. The method of claim 10, wherein scheduling comprises informing the mobile station of a number of sub-frames on which the mobile station may transmit and a location of the sub-frames in the transmission interval.

26. A method for controlling communications with a mobile station by a base station comprising steps of:
   storing, by the base station, traffic data from the mobile station in a traffic data buffer;
   determining a reverse link signal quality metric at the base station, wherein the reverse link signal quality metric comprises a reverse link power control metric;
   comparing the reverse link power control metric to an inner loop power control setpoint; and
   when a ratio of the reverse link power control metric to the inner loop power control setpoint exceeds a threshold, flushing the traffic data buffer.

27. A method for controlling communications with a mobile station by a base station comprising steps of:
   determining, by the base station, a link quality metric at the base station;
   comparing, by the base station, the link quality metric to a threshold; and
   when the link quality metric compares unfavorably with the threshold, deallocating, by the base station, demodulation resources allocated to a first uplink control channel associated with the mobile station while maintaining allocation of demodulation resources associated with a second uplink control channel that is associated with the mobile station, wherein each of the demodulation resources allocated to a first uplink control channel and the demodulation resources associated with a second uplink control channel demodulation resource comprises a RAKE finger.

28. The method of claim 27, wherein the link quality metric comprises a reverse link power control metric and wherein comparing comprises comparing the reverse link power control metric to an inner loop power control setpoint.

29. The method of claim 28, wherein the threshold comprises a first threshold and wherein the link quality metric compares unfavorably with a threshold when a ratio of the reverse link power control metric to an inner loop power control setpoint exceeds a second threshold.

30. A method for controlling communications with a mobile station by a base station comprising steps of:
   transmitting, by the base station, first control data to the mobile station on a downlink control channel;
   upon transmitting the first control data, starting, by the base station, a timer; and
   when a predetermined period of time expires prior to receiving second control data from the mobile station on an uplink control channel, deallocating, by the base station, demodulation resources allocated to a first uplink control channel associated with the mobile station while maintaining allocation of demodulation resources associated with a second uplink control channel that is associated with the mobile station, wherein each of the demodulation resources allocated to a first uplink control channel and the demodulation resources associated with a second uplink control channel demodulation resource comprises a RAKE finger.

31. A method for scheduling mobile station uplink transmissions by a base station comprising steps of:
   receiving scheduling information from a mobile station, wherein the scheduling information comprises at least one of a queue status and a power status of the mobile station;
   determining an uplink channel scheduling assignment for the mobile station using at least one of the scheduling information and a base station interference metric and a link quality corresponding to the selected mobile station;
   transmitting the uplink channel scheduling assignment to the mobile station, wherein the uplink channel scheduling assignment comprises a maximum traffic channel to control channel power ratio that the mobile station is allowed to use in a subsequent reverse link transmission; and
   receiving, from the mobile station, a transmission of data, which transmission of data is conveyed by the mobile station during a transmission interval and comprises transport format and resource-related information (TFRI);
   wherein the scheduling information is received via a first reverse link control channel and the transport format and resource-related information (TFRI) is received via a second reverse link control channel.

32. A method for scheduling a mobile station uplink transmission comprising steps of:
   transmitting scheduling information by the mobile station, wherein the scheduling information comprises at least one of a queue status and a power status of the mobile station;
   receiving, by the mobile station from a base station, an uplink channel scheduling assignment, wherein the uplink channel scheduling assignment comprises a maximum power margin target;
   selecting, by the mobile station and based on the maximum power margin target, a modulation and coding scheme for an uplink transmission; and
   transmitting, by the mobile station, an indication of the selected modulation and coding scheme.

33. The method of claim 32, wherein selecting comprises selecting, by the mobile station, transport format and resource-related information (TFRI) based on the received interference information and wherein transmitting comprises transmitting an indication of the selected TFRI.

34. A mobile station comprising:
 means for transmitting scheduling information, wherein the scheduling information comprises at least one of a queue status and a power status of the mobile station;
 means for receiving, from a base station, an uplink channel scheduling assignment that is based on the scheduling information, wherein the uplink channel scheduling assignment comprises a maximum traffic channel to control channel power ratio;
 means for selecting a modulation and coding scheme based on the maximum traffic channel to control channel power ratio and for an uplink transmission; and
 means for transmitting an indication of the selected modulation and coding scheme to the base station.

35. The mobile station of claim 34, wherein selecting a modulation and coding scheme comprises selecting transport format and resource-related information (TFRI) based on the maximum traffic channel to control channel power ratio and wherein transmitting an indication of the selected modulation and coding scheme comprises transmitting an indication of the selected TFRI.

36. A method for transmitting data by a mobile station comprising steps of:
 receiving, at the mobile station, interference information associated with, and conveyed to the mobile station by, a base station;
 selecting, by the mobile station, a modulation and coding scheme based on the received interference information;
 transmitting data in a first reverse link channel; and
 transmitting an indication of the selected modulation and coding scheme in a second reverse link channel, wherein the selected modulation and coding scheme can be used to demodulate and decode the transmitted data.

37. The method of claim 36, wherein the transport format and resource-related information (TFRI) is transmitted via a second reverse link control channel.

38. The method of claim 36, wherein receiving comprises receiving a scheduling assignment that comprises the interference information associated with a base station.

39. The method of claim 38, wherein receiving a scheduling assignment comprises receiving a plurality of scheduling assignments from a plurality of base stations, wherein each scheduling assignment of the plurality of scheduling assignments is associated with interference information, and wherein the method further comprises choosing a scheduling assignment of the plurality of scheduling assignments based on the associated interference information.

40. The method of claim 39, wherein the interference information associated with each scheduling assignment comprises transport format and resource-related information (TFRI).

41. The method of claim 39, further comprising determining the corresponding transport format and resource-related information (TFRI) transmitted in the second reverse link channel based on the TFRI of only one base station of the plurality of base stations.

42. The method of claim 36, wherein receiving comprises receiving interference information from a plurality of base stations and wherein determining comprises determining the corresponding transport format and resource-related information (TFRI) transmitted in the second reverse link channel based on interference information of only one base station of the plurality of base stations.

43. The method of claim 42, wherein determining comprises determining the transport format and resource-related information (TFRI) based on a base station with a largest Enhanced Uplink Dedicated Transport Channel (EUDCH) to Dedicated Physical Control Channel (DPCCH) (DPPCH) power ratio.

44. The method of claim 36 wherein the first reverse link channel and the second reverse link channel are time multiplexed on a same physical control channel such that, in a given transmission interval, either a first reverse link channel ten (10) millisecond (ms) frame format is used or a second reverse link channel two (2) millisecond (ms) frame format is used.

45. The method of claim 44, wherein when there is not a scheduled transmission interval then the first reverse link channel ten (10) millisecond (ms) frame format is used and when there is a scheduled transmission interval then the second reverse link channel two (2) millisecond (ms) frame format is used.

46. The method of claim 36, wherein the second reverse link channel has a first part and a second part, wherein the second part can be decoded separate from the first part, and wherein the first part comprises block size and modulation and coding information and the second part comprises Hybrid Automatic Repeat Request (H-ARQ) and Incremental Redundancy version information.

* * * * *